(12) United States Patent
Minas

(10) Patent No.: US 12,359,773 B2
(45) Date of Patent: Jul. 15, 2025

(54) SYSTEMS, METHODS, AND APPARATUS FOR REFUELING HYDROGEN AIRCRAFT

(71) Applicant: General Electric Company, Schenectady, NY (US)

(72) Inventor: Constantinos Minas, Niskayuna, NY (US)

(73) Assignee: General Electric Company, Evendale, OH (US)

(*) Notice: Subject to any disclaimer, the term of this patent is extended or adjusted under 35 U.S.C. 154(b) by 202 days.

(21) Appl. No.: 18/185,155

(22) Filed: Mar. 16, 2023

(65) Prior Publication Data

US 2024/0309995 A1  Sep. 19, 2024

(51) Int. Cl.
*F17C 5/00* (2006.01)
*F17C 5/06* (2006.01)

(52) U.S. Cl.
CPC ............ *F17C 5/002* (2013.01); *F17C 5/06* (2013.01); *F17C 2205/0323* (2013.01); *F17C 2205/0338* (2013.01); *F17C 2205/037* (2013.01); *F17C 2221/012* (2013.01); *F17C 2221/014* (2013.01); *F17C 2223/013* (2013.01);
(Continued)

(58) Field of Classification Search
CPC .... F17C 5/002; F17C 5/06; F17C 2205/0323; F17C 2205/0338; F17C 2205/037; F17C 2221/012; F17C 2221/014; F17C 2223/013; F17C 2223/0161; F17C 2227/0135; F17C 2227/0337; F17C 2250/0439;
(Continued)

(56) References Cited

U.S. PATENT DOCUMENTS 3,979,005 A * 9/1976 Robinson ............... B64D 37/06
                                                    220/560.07
4,821,907 A    4/1989 Castles
(Continued)

FOREIGN PATENT DOCUMENTS

CN    113124313 B    8/2022
DE    4445183 A1     9/1995
(Continued)

OTHER PUBLICATIONS

European Patent Office, "Extended European Search Report," issued in connection with European Patent Application No. 24160608.6, dated Jul. 9, 2024, 7 pages.
(Continued)

*Primary Examiner* — Craig M Schneider
*Assistant Examiner* — Christopher M Afful
(74) *Attorney, Agent, or Firm* — Hanley, Flight & Zimmerman, LLC

(57) ABSTRACT

Example systems, methods, and apparats for refueling hydrogen aircraft are disclosed herein. An example multi-phase hydrogen refueling system includes a liquid hydrogen (LH2) tank coupled to at least one of a cryo-compressed hydrogen (CcH2) tank and a gaseous hydrogen (GH2) tank; a liquid nitrogen (LN2) tank; and a hydrant coupled to the LH2 tank, the CcH2 tank, the GH2 tank, and the LN2 tank, the hydrant including: a transfer line to refuel an aircraft with at least LH2, CcH2, or GH2; a purge valve to purge the transfer line using at least one of nitrogen (N2) from the LN2 tank or GH2 from the GH2 tank; and a GH2 return line to transmit evaporated GH2 back to the GH2 tank.

17 Claims, 13 Drawing Sheets

(52) U.S. Cl.
CPC ............... *F17C 2223/0161* (2013.01); *F17C 2227/0135* (2013.01); *F17C 2227/0337* (2013.01); *F17C 2250/0439* (2013.01); *F17C 2250/0452* (2013.01); *F17C 2265/065* (2013.01); *F17C 2270/0189* (2013.01)

(58) Field of Classification Search
CPC ........ F17C 2250/0452; F17C 2265/065; F17C 2270/0189
USPC .......................................................... 141/11
See application file for complete search history.

(56) References Cited

U.S. PATENT DOCUMENTS

| | | | |
|---|---|---|---|
| 4,961,325 A | 10/1990 | Halvorson | |
| 5,048,597 A | 9/1991 | Bond | |
| 5,582,016 A | 12/1996 | Gier | |
| 6,755,225 B1* | 6/2004 | Niedwiecki | F17C 7/02 141/2 |
| 7,360,563 B2 | 4/2008 | Mitlitsky | |
| 7,810,669 B2 | 10/2010 | Westenberger | |
| 8,372,554 B2 | 2/2013 | Hoffjann | |
| 8,430,237 B2 | 4/2013 | Westenberger | |
| 8,430,360 B2 | 4/2013 | Schwarze | |
| 8,726,676 B2 | 5/2014 | Watts | |
| 8,950,195 B2 | 2/2015 | Watts | |
| 9,982,843 B2 | 5/2018 | Kawai | |
| 10,082,246 B2 | 9/2018 | Aceves | |
| 10,240,721 B2 | 3/2019 | Dawson | |
| 10,260,678 B2 | 4/2019 | Christ | |
| 10,466,722 B2 | 11/2019 | Mortensen | |
| 10,495,258 B2 | 12/2019 | Unno et al. | |
| 11,072,023 B2 | 7/2021 | Conrad | |
| 11,236,864 B1 | 2/2022 | Ewan | |
| 11,453,514 B2 | 9/2022 | Rainville | |
| 2007/0020173 A1 | 1/2007 | Repasky | |
| 2007/0227160 A1 | 10/2007 | Johnson | |
| 2008/0216913 A1* | 9/2008 | Kederer | F17C 5/007 141/2 |
| 2013/0299501 A1 | 11/2013 | Lee | |
| 2014/0026597 A1 | 1/2014 | Epstein | |
| 2017/0341769 A1* | 11/2017 | Haberbusch | F17C 5/007 |
| 2021/0239257 A1* | 8/2021 | Stautner | F16L 59/18 |
| 2021/0340908 A1 | 11/2021 | Boucher | |
| 2022/0307651 A1* | 9/2022 | Bartlok | F17C 7/04 |
| 2023/0349513 A1* | 11/2023 | Bernhardt | F17C 9/00 |
| 2024/0133523 A1 | 4/2024 | Oshibe et al. | |

FOREIGN PATENT DOCUMENTS

| | | |
|---|---|---|
| GB | 2295858 A | 6/1996 |
| WO | 2022138723 A1 | 6/2022 |

OTHER PUBLICATIONS

Korycinski, "Air Terminals and Liquid Hydrogen Commercial Air Transports," Int. J. Hydrogen Energy, vol. 3, pp. 231-250, 1977, 20 pages.

\* cited by examiner

SYSTEMS, METHODS, AND APPARATUS FOR REFUELING HYDROGEN AIRCRAFT

FIELD OF THE DISCLOSURE

This disclosure relates generally to refueling systems, and, more particularly, to systems, methods, and apparatus for refueling hydrogen aircraft.

BACKGROUND

Hydrogen-powered aircraft use hydrogen fuel as a power source. The hydrogen fuel may be stored onboard as liquid hydrogen (LH2), gaseous hydrogen (GH2), and/or cryo-compressed hydrogen (CcH2) in one or more tanks. The LH2 can be vaporized into gaseous hydrogen (GH2) to be used as the fuel. In some examples, the GH2 is burned in gas turbine engines to generate thrust. In other examples, the GH2 is used to power a fuel cell to generate electricity to power a propulsor, such as a propeller.

BRIEF DESCRIPTION OF THE DRAWINGS

A full and enabling disclosure of the present technology, including the best mode thereof, directed to one of ordinary skill in the art, is set forth in the specification, which makes reference to the appended Figures, in which.

The figures are not to scale. In general, identical reference numbers used throughout the drawing(s) indicate the same elements, and accompanying written descriptions refer to the same or like parts.

DETAILED DESCRIPTION

Figure 1:
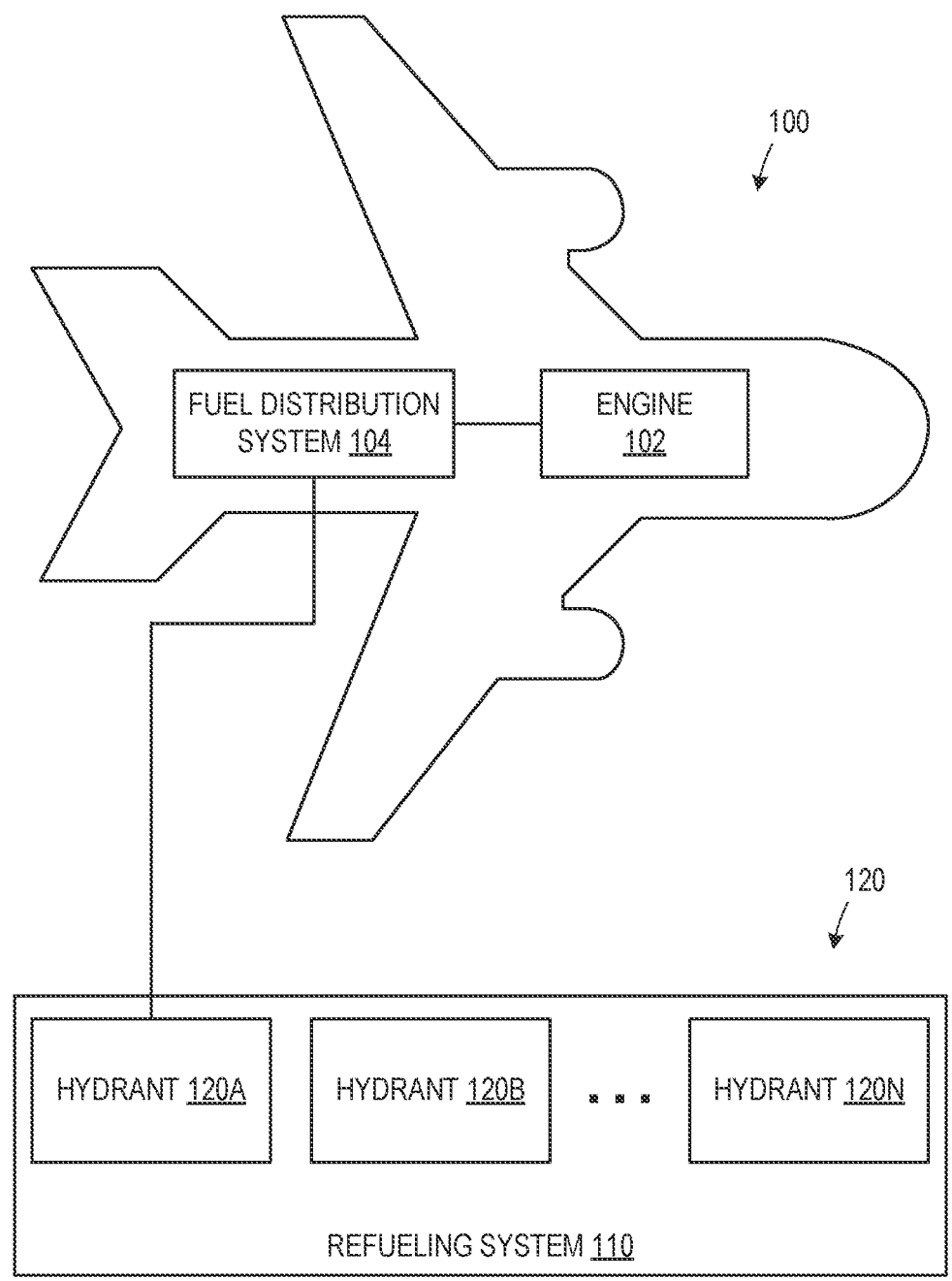
FIG. 1 is an illustration of an example aircraft that can be refueled using teachings disclosed herein.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

As used herein, the terms "upstream" and "downstream" refer to locations along a fluid flow path relative to a direction of fluid flow from a first location to a second location. For example, with respect to a fluid flow, "upstream" refers to the first location from which the fluid flows, and "downstream" refers to the second location toward which the fluid flows. For example, with regard to a gas turbine engine, a compressor is said to be upstream of a turbine relative to a flow direction of air flowing through the engine.

Some hydrogen aircraft store hydrogen fuel in multiple phases in onboard tanks. For example, an aircraft can include a tank to store gaseous hydrogen (GH2), a cryogenic tank to store liquid hydrogen (LH2), and/or a cryo-compressed tank to store cryo-compressed hydrogen (CcH2). Hydrogen aircraft use GH2 to generate power and motive thrust. For example, aircraft can burn the GH2 fuel in a gas turbine engine. Alternatively, aircraft can use a hydrogen fuel cell (e.g., proton exchange membrane fuel cell, etc.) to generate electricity to power an electric motor (e.g., propeller, turboprop, etc.). In these and other examples, the hydrogen fuel is stored as LH2 and/or CcH2 and is converted to GH2 to be used as fuel. However, onboard GH2 storage tanks are still necessary for fuel distribution purposes, such as for providing a driving pressure, purging fuel lines, initiating combustion, etc. Furthermore, hydrogen aircraft can include tanks of compressed natural gas to be combusted in the engine during initial operation before hydrogen fuel is introduced.

It should be noted that an engine is less efficient upon startup and/or during a period of time (e.g., five minutes, ten minutes, etc.) after startup. Furthermore, the cost of GH2 is higher than that of CNG. Thus, some hydrogen aircraft use CNG to ignite the combustor and/or warm up the engine to reduce consumption of valuable hydrogen fuel.

Some conventional airports have fuel systems or networks to refuel aircraft with hydrocarbon fuel (e.g., Jet-A1) but are not equipped to provide hydrogen fuel to multiple aircraft efficiently (e.g., concurrently, simultaneously, etc.) from a common fuel source (e.g., cryogenic tank). Typically, to fuel a hydrogen powered aircraft, a cryogenic tanker capable of storing and transporting hydrogen fuel is driven to a location of the aircraft (e.g., on tarmac, at terminal, etc.). Alternatively, an array or grid of cryogenic tanks (e.g., LH2 tanks, CcH2 tanks, etc.) can occupy a portion of the airport. However, the number of tankers permitted to drive on the tarmac and/or the number of tanks able to be stored at the airport are limited. As such, there is a limit to the number of hydrogen aircraft that a given airport can accommodate. With increasing prevalence of hydrogen aircraft, it is advantageous for airports (e.g., commercial airports, general aviation airports, military bases, etc.) to have one or more conveniently located refueling stations (e.g., at a terminal and/or a gate) at which multiple hydrogen aircraft can refuel.

Example multiphase hydrogen refueling systems and methods for operating the same are disclosed herein. Disclosed systems include a cryogenic hydrogen source including at least one of a liquid hydrogen (LH2) tank or a cryo-compressed hydrogen (CcH2) tank. Furthermore, disclosed systems include a gaseous hydrogen (GH2) source including a GH2 tank and nitrogen (N2) source including a liquid nitrogen (LN2) tank.

Example hydrants (or hydrant apparatus) employed in an example multiphase hydrogen refueling system are disclosed herein. Disclosed hydrants include a cryogenic hydrogen port coupled to a cryogenic transfer line, which is to be coupled to a refueling port of an aircraft. Furthermore, disclosed hydrants include a GH2 port coupled to a GH2 transfer line and the GH2 source and an N2 port coupled to an N2 transfer line and the N2 source.

Example methods to implement multiphase hydrogen refueling systems and/or hydrants are disclosed herein. Such methods include purging the cryogenic transfer line using the N2, purging the cryogenic transfer line using the GH2, cooling the cryogenic transfer line using at least one of LH2 or CcH2, and, refueling an aircraft with a hydrogen fuel after a temperature within the cryogenic transfer line satisfies a cooldown threshold.

Example systems and methods disclosed herein allow hydrogen aircraft to refuel with multiple types/phases of hydrogen at a hydrant of the refueling station. For example, the hydrant includes at least one transfer line that can be coupled to the aircraft and at least one of an LH2 line, a CcH2 line, or a GH2 line of the hydrant to refuel with LH2, CcH2, and/or GH2 either sequentially or simultaneously.

Disclosed systems and methods allow the transfer line, a fuel line (e.g., the LH2 line, the CcH2 line, the GH2 line, etc.) to be purged prior to refueling to remove contaminants from the hydrogen fuel, such as oxygen, carbon dioxide, argon, etc. Furthermore, disclosed examples allow the transfer line to be cooled prior to refueling to conserve hydrogen fuel, maintain a consistent refueling flowrate, and/or inhibit GH2 from entering the associated onboard storage tank (e.g., LH2 tank, CcH2 tank, etc.). Conventional LH2 or CcH2 refueling systems may vent evaporated hydrogen fuel while the aircraft is refueled with LH2 and/or CcH2. Such evaporation can cause the flowrate of hydrogen fuel to fluctuate or can cause evaporated GH2 to enter the aircraft, which occupies valuable onboard storage space or increases the vapor pressure within the storage tank. Conventional refueling systems may vent the evaporated GH2 to mitigate these effects, which results in wasted hydrogen fuel. Disclosed systems can capture evaporated GH2 and transmit the GH2 to the GH2 tanks that are already in use for GH2 refueling.

Furthermore, disclosed multiphase hydrogen refueling systems include a CNG source, such as a liquid natural gas (LNG) tank, and disclosed hydrants include a CNG port coupled to the CNG source and a CNG transfer line. As such, example systems disclosed herein can supply CNG to a hydrogen aircraft via the same hydrant from which the aircraft obtains LH2, CcH2, and/or GH2 fuel.

FIG. 1 is an illustration of an example aircraft 100 (e.g., hydrogen powered commercial, military, cargo aircraft, etc.) including an engine 102 and a fuel distribution system 104. In some examples, the engine 102 is a gas turbine engine capable of burning hydrogen fuel (e.g., GH2) to generate thrust. In other examples, the engine 102 includes one or more hydrogen fuel cell stacks that uses hydrogen fuel to generate electricity to power a motor and rotate a propulsor, such as a propeller. The fuel distribution system 104 can include one or more tanks (e.g., cryogenic LH2 tanks, pressurized GH2 tanks, etc.) to provide a flow of hydrogen to the engine 102.

In the illustrated example of FIG. 1, the fuel distribution system 104 is coupled to a refueling network or refueling system 110 to refuel with hydrogen and/or hydrocarbon fuel. The refueling system 110 of FIG. 1 includes a plurality of hydrants 120 that can each be coupled to an aircraft (e.g., the aircraft 100, etc.) to provide fuel to the aircraft from a common source. For example, the plurality of hydrants 120 includes a first hydrant 120A coupled to the fuel distribution system 104 (e.g., a tank of the fuel distribution system 104) of the aircraft 100 and a second hydrant 120B to be coupled to another fuel distribution system of another aircraft. The plurality of hydrants 120 can include any number of hydrants up to a final hydrant 120N based on the size of the refueling system 110, the number of aircraft to be refueled, the limitations of an associated airport, etc.

Figure 2A:
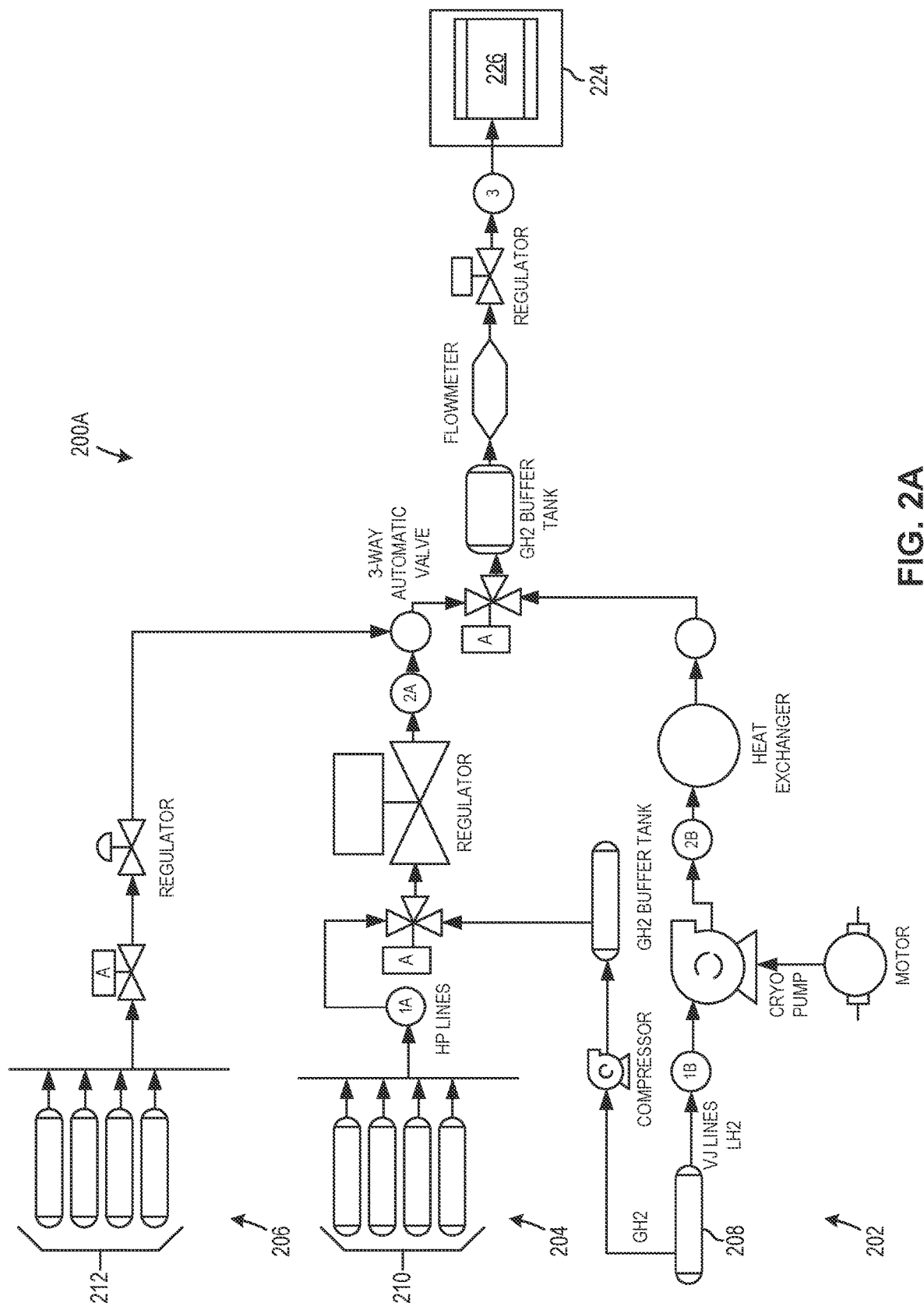
FIG. 2A is a schematic illustration of a first example fuel distribution system that can be used in the aircraft of FIG. 1.
Figure 2B:
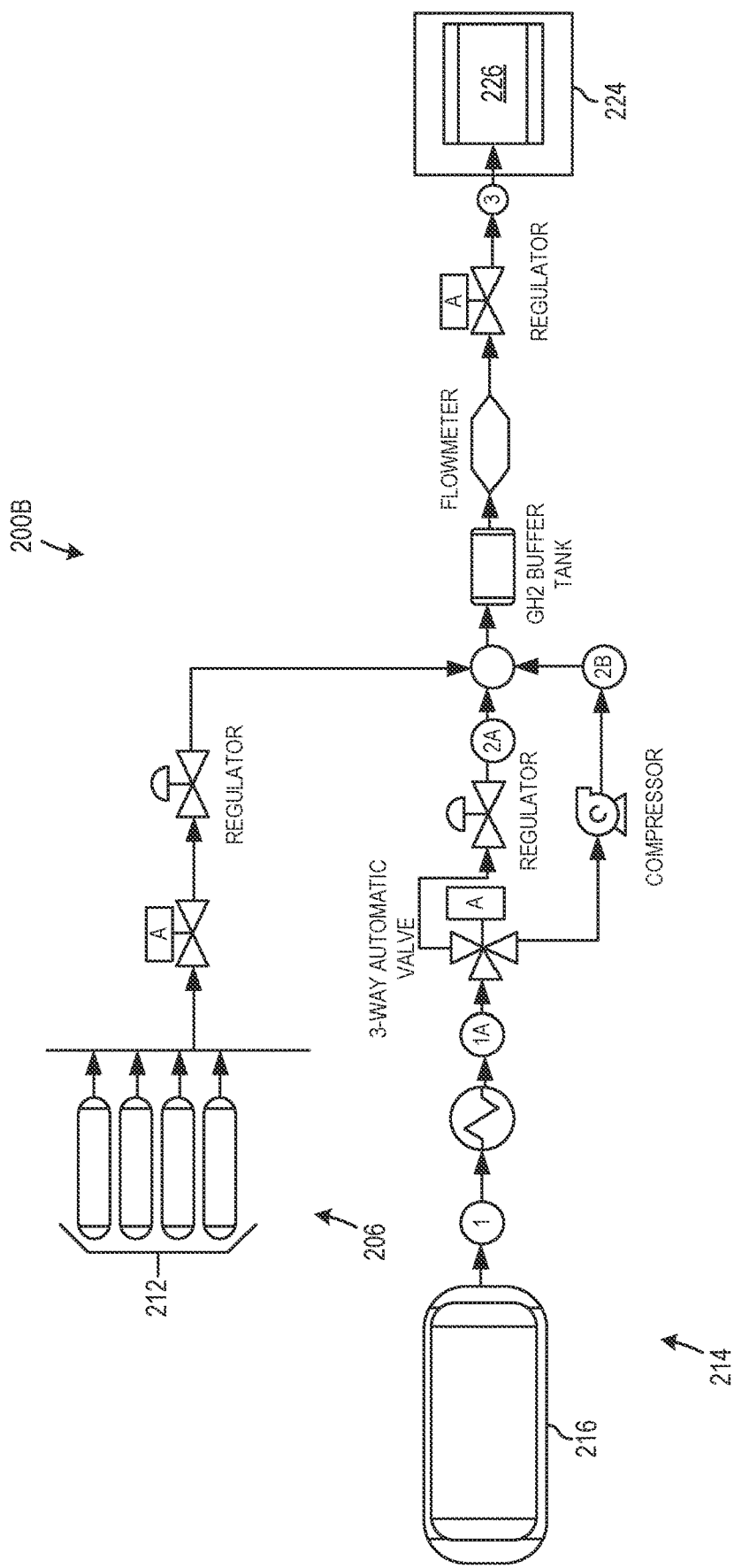
FIG. 2B is a schematic illustration of a second example fuel distribution system that can be used in the aircraft of FIG. 1.
Figure 2C:
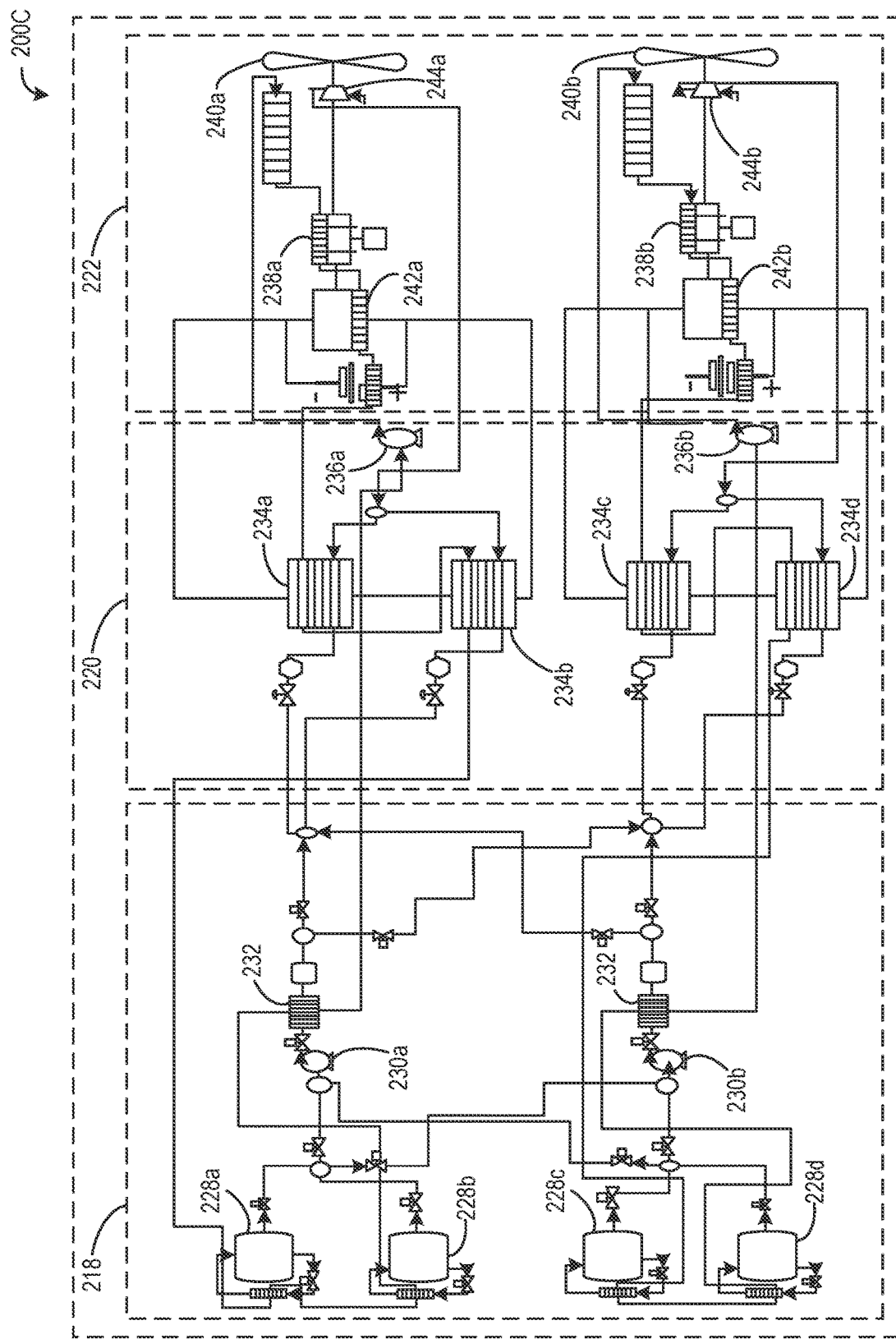
FIG. 2C is a schematic illustration of a third example fuel distribution system that can be used in the aircraft of FIG. 1.

FIG. 2A is a schematic illustration of a first example fuel distribution system 200A that can be used in the aircraft 100 of FIG. 1. FIG. 2B is a schematic illustration of a second example fuel distribution system 200B that can be used in the aircraft 100 of FIG. 1. FIG. 2C is a block diagram of a third example fuel distribution system 200C that can be used in the aircraft 100 of FIG. 1. In other words, the first fuel distribution system 200A, the second fuel distribution system 200B, and/or the third fuel distribution system 200C can implement the fuel distribution system 104 of FIG. 1.

The first fuel distribution system 200A of FIG. 2A includes an LH2 delivery assembly 202, a GH2 delivery assembly 204, and a CNG delivery assembly 206. The LH2 delivery assembly 202 includes an LH2 tank 208; the GH2 delivery assembly 204 includes a GH2 tank bank 210; and the CNG delivery assembly 206 includes a CNG tank bank 212. The second fuel distribution system 200B of FIG. 2B includes the CNG delivery assembly 206 and a CcH2 delivery assembly 214, which includes a CcH2 tank 216. The third fuel distribution system 200C of FIG. 2C includes a hydrogen fuel storage system 218, a fuel cell stack 220, and an electric propulsor system 222.

In the illustrated examples of FIGS. 2A and 2B, the delivery assemblies 202, 204, 206, 214 provide fuel (e.g., hydrogen fuel and/or natural gas) to an engine 224 of a vehicle (e.g., the aircraft 100 of FIG. 1, etc.). The engine 224 can be a gas turbine engine, for example. More specifically, GH2 fuel and/or CNG fuel is provided to a combustor 226 of the engine 224, which burns the fuel to generate mechanical power. The engine 224 then converts the mechanical power into thrust.

The first fuel distribution system 200A of FIG. 2A includes the LH2 tank 208 to hold a first portion of hydrogen fuel in a liquid phase and the GH2 tank bank 210 to hold a second portion of hydrogen fuel in a gaseous phase. The second fuel distribution system 200B of FIG. 2B includes the CcH2 tank 216 to hold cryo-compressed hydrogen fuel (e.g., LH2 compressed to pressures between 100 and 400 Bar at temperatures between 40 and 300 Kelvin (K)). Both the first and second fuel distribution systems 200A, 200B include the CNG tank bank 212 to hold hydrocarbon fuel. In some examples, the GH2 tank bank 210 and/or the CNG tank bank 212 can be used to fuel the engine 224 during takeoff and climbing phases of flight. Furthermore, the LH2 tank 208 or the CcH2 tank 216 can be used during cruising and/or landing phases of flight. For example, fuel consumption needs can vary based on a particular phase of flight (e.g., taxi, takeoff, cruise, etc.). A relatively low fuel flow rate (e.g., between about 25% and about 40% of the maximum hydrogen fuel flow rate) can be involved during a cruising operation, while the takeoff phase can involve the highest fuel flow rate (e.g., about 100% of a maximum hydrogen fuel flow rate for a given flight path). Switching between the LH2 delivery assembly 202, the GH2 delivery assembly 204, the CNG delivery assembly 206, and/or the CcH2 delivery assembly 214 allows for varying types of fuel distribution based on a given operation or flight phase of the aircraft 100. As such, the aircraft 100 can switch between multiple forms and/or phases of fuel (e.g., LH2, GH2, CNG, etc.) during flight to conserve hydrogen fuel, which is much more expensive than natural gas fuel.

In some examples, the aircraft 100 is a hydrogen electric aircraft that implements the third fuel distribution system 200C. The third fuel distribution system 200C includes the hydrogen fuel storage system 218 to manage hydrogen fuel (e.g., LH2, etc.) stored in tanks 228a, 228b, 228c, 228d at pressures greater than a pressure threshold (e.g., 8 Bar, 10 Bar, 11 Bar, 12 Bar, 15 Bar, etc.). The hydrogen fuel storage system 218 includes pumps 230a, 230b to circulate the hydrogen fuel through the third fuel distribution system 200C and through the fuel cell stack 220. The hydrogen fuel storage system 218 further includes vaporizers 232a, 232b to convert LH2 fuel to GH2 fuel and/or to warm GH2 fuel to a temperature (e.g., 275K, etc.) associated with the fuel cell stack 220. The fuel cell stack 220 receives hydrogen fuel (e.g., GH2, etc.) from the hydrogen fuel storage system 218 and compressed air from the electric propulsor system 222, and outputs electricity from proton exchange membrane (PEM) hydrogen fuel cells 234a, 234b, 234c, 234d to the electric propulsor system 222. The third fuel distribution system 200C includes coolant pumps 236a, 236b to pump a coolant (e.g., water, oil, ethylene glycol, etc.) through the fuel cell stack 220 and capture thermal energy that the fuel cells 234a-234d emit. The electric propulsor system 222 of FIG. 2C receives electricity from the fuel cells 234a-234d of the fuel cell stack 220 to power electric motors 238a, 238b to drive propulsors 240a, 240b. In the example of FIG. 3, the electric propulsor system 222 includes electric buses 242a, 242b to direct electrical flow from the fuel cell stack 220 to the electric motors 238a, 238b. In some examples, compressed air is drawn from air compressors 244a, 244b and provided to the fuel cells 234a-234d of the fuel cell stack 220. Thus, the fuel cell stack 220 generates electrical current based on redox reactions between the hydrogen fuel (e.g., GH2, etc.) and an oxidizing agent (e.g., air, etc.). The electric motors 238a, 238b can then convert the electricity into mechanical power and transfer the mechanical power to the propulsors 240a, 240b via a rotating shaft, for example.

Figure 3A:
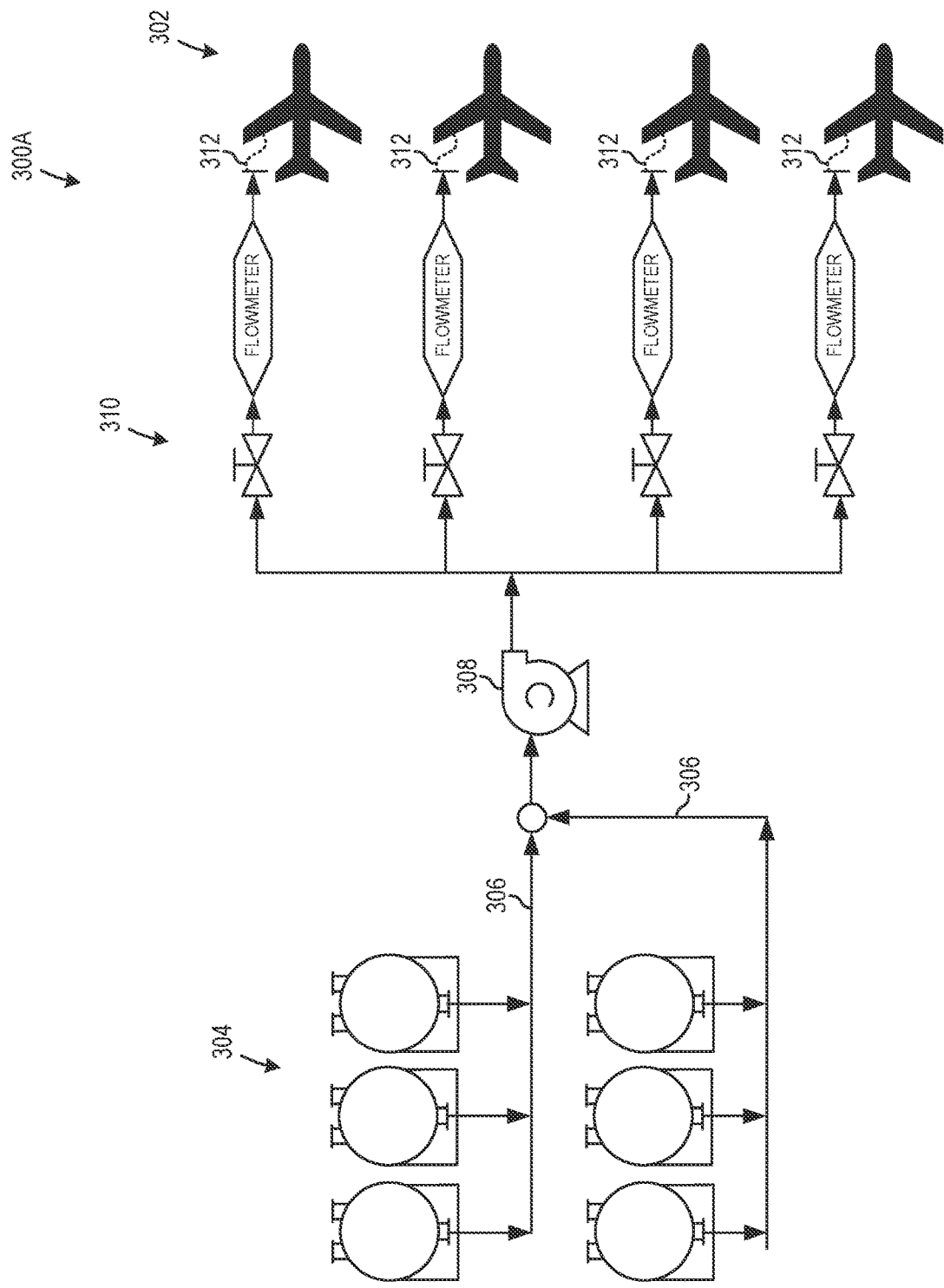
FIG. 3A is a schematic illustration of a first example hydrogen refueling system that can be used to refuel the aircraft of FIG. 1.
Figure 3B:
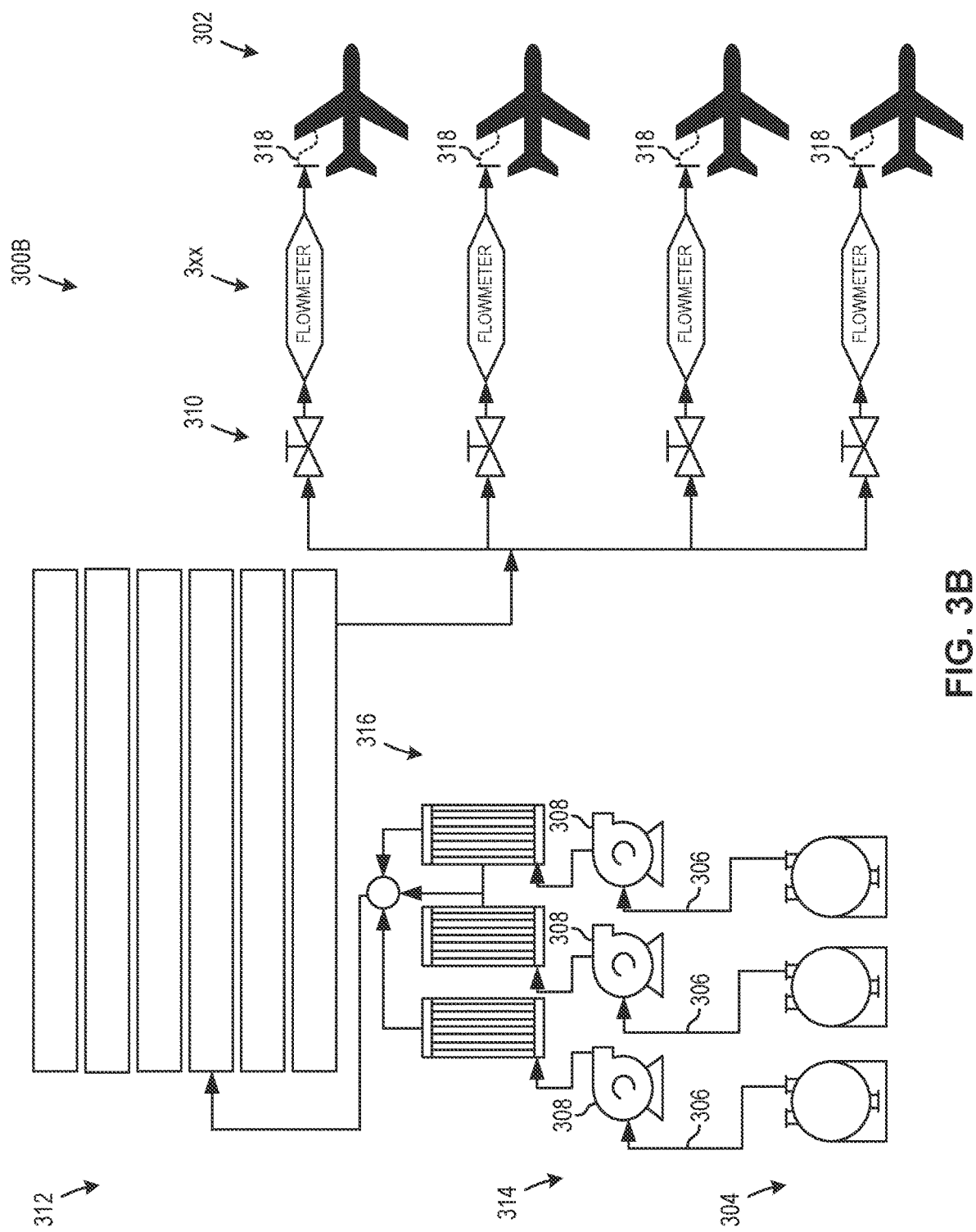
FIG. 3B is a schematic illustration of a second example hydrogen refueling system that can be used to refuel the aircraft of FIG. 1

FIG. 3A is a schematic illustration of an example LH2 refueling system 300A that can be used to refuel the aircraft 100 of FIG. 1. FIG. 3B is a schematic illustration of an example GH2 refueling system 300B that can also be used to refuel the aircraft 100 of FIG. 1. In other words, both the LH2 refueling system 300A and the GH2 refueling system 300B can implement the refueling system 110 of FIG. 1. In the illustrated examples of FIGS. 3A and 3B, the LH2 refueling system 300A can refuel a plurality of aircraft 302 (e.g., hydrogen aircraft, etc.) with LH2 fuel, and the GH2 refueling system 300B can refuel the plurality of aircraft 302 with GH2 fuel. That is, the LH2 refueling system 300A and the GH2 refueling system 300B can only refuel the aircraft 302 with one phase of hydrogen fuel.

The LH2 refueling system 300A of FIG. 3A includes an LH2 tank farm 304 (e.g., LH2 fuel source) to provide LH2 fuel to the plurality of aircraft 302. In the LH2 refueling system 300A of FIG. 3A, vacuum jacketed (VJ) lines 306 transmit the LH2 fuel from the LH2 tank farm 304 to an LH2 pump 308. The LH2 pump 308 cryogenically pressurizes the LH2 to drive the fuel to a plurality of hydrants 310, which are coupled to the plurality of aircraft 302.

The GH2 refueling system 300B of FIG. 3B includes the LH2 tank farm 304 to provide hydrogen to a GH2 tank bank 312, which then provides the GH2 fuel to the plurality of aircraft 302 via the hydrants 310. The GH2 refueling system 300B includes a plurality of LH2 pumps 314 to drive the LH2 from the LH2 tank farm 304 to a plurality of vaporizers 316. In the illustrated example of FIG. 3B, the plurality of LH2 pumps 314 includes the LH2 pumps 308 as shown in FIG. 3A. That is, each one of the LH2 pumps 308 in the plurality of LH2 pumps 314 is coupled to respective ones of the LH2 tanks in the LH2 tank farm 304. The LH2 pump 308 increases the pressure of LH2 based on a storage pressure in the LH2 tank farm 304. For example, the LH2 pump 308 can increase the pressure of LH2 from 12 Bar to 700 Bar. The plurality of LH2 pumps 314 increases the pressure of the LH2 such that, when the vaporizers 316 convert the LH2 to GH2, the GH2 continues to the GH2 tank bank 312 due to pressure driven flow.

In the illustrated examples of FIGS. 3A and 3B, the plurality of aircraft 302 are coupled to the plurality of hydrants 310 via flexible VJ lines 318, which can conform to various orientations based on positions of the aircraft 302. Furthermore, the LH2 and GH2 refueling systems 300A, 300B include flowmeters 320 to monitor a fuel flow rate (e.g., volumetric flow rate, mass flow rate, etc.) during a refueling process to determine how much fuel is transmitted to the aircraft 302 over a certain time period.

The LH2 refueling system 300A and the GH2 refueling system 300B of FIGS. 3A and 3B can provide LH2 fuel and GH2 fuel to the hydrogen aircraft 302 (e.g., the aircraft 100 of FIG. 1, etc.). However, as shown in FIGS. 2A and 2B, many hydrogen aircraft include multiple types of storage and delivery systems for different phases of hydrogen fuel. Thus, to refuel with both liquid and gaseous phases of hydrogen fuel, the aircraft must disconnect from the LH2 refueling system 300A, taxi to another location, and reconnect to the GH2 refueling system 300B to complete the refueling process. Thus, refueling hydrogen aircraft with the LH2 and GH2 refueling systems 300A, 300B consumes time and fuel as well as imposes logistical complications for the airport.

Figure 4:
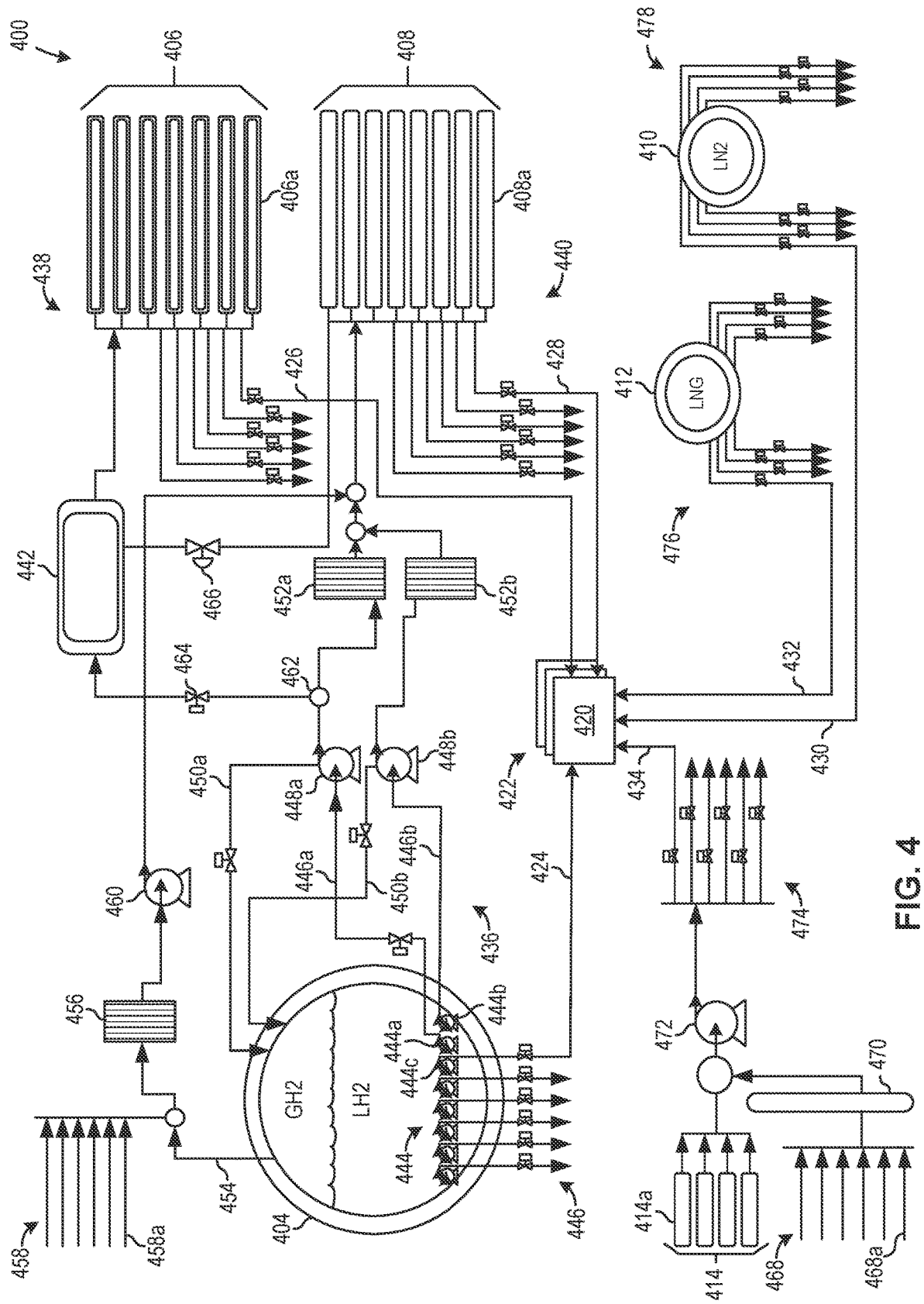
FIG. 4 is a schematic illustration of an example multi-phase hydrogen refueling system in accordance with teachings disclosed herein.

FIG. 4 is a schematic illustration of an example multiphase hydrogen refueling system 400 in accordance with teachings disclosed herein. The multiphase hydrogen refueling system 400 includes an example LH2 tank 404 fluidly coupled to a CcH2 tank bank 406 and a GH2 tank bank 408. The multiphase hydrogen refueling system 400 further includes a liquid nitrogen (LN2) tank 410, a liquid natural gas (LNG) tank 412, and a compressed natural gas (CNG) tank bank 414. In the illustrated example, the CcH2 tank bank 406 includes a CcH2 tank 406a (e.g., a first CcH2 tank), the GH2 tank bank 408 includes a GH2 tank 408a, and the CNG tank bank 414 includes a CNG tank 414a. In some examples, the CcH2, GH2, and CNG tank banks 406, 408, 414 include just the CcH2, GH2, and CNG tanks 406a, 408a, 414a, respectively. In other examples, the CcH2, GH2, and CNG tank banks 406, 408, 414 include a plurality of CcH2, GH2, and CNG tanks, including the CcH2 tank 406a, the GH2 tank 408a, and the CNG tank 414a, respectively.

In some examples, the number of tanks included the CcH2, GH2, and CNG tank banks 406, 408, 414 is based on the number and/or type of aircraft to be refueled by the multiphase hydrogen refueling system 400 during a period (e.g., time between tank replenishments). In some examples, the number of GH2 tanks included in the GH2 tank bank 408 is greater than the number of CcH2 tanks in the CcH2 tank bank 406 due to a prevalence of GH2 storage on some hydrogen aircraft.

The multiphase hydrogen refueling system 400 of FIG. 4 includes a hydrant 420 (e.g., refueling hydrant) fluidly coupled to the LH2 tank 404, the CcH2 tank 406a, the GH2 tank 408a, the LN2 tank 410, the LNG tank 412, and the CNG tank 414a. In some examples, the hydrant 420 is fluidly coupled to the CcH2 tank bank 406, the GH2 tank bank 408, and/or the CNG tank bank 414 rather than an individual tank of the tank banks 406, 408, 414. In some examples, the multiphase hydrogen refueling system 400 includes a plurality of hydrants 422 including the hydrant 420 of FIG. 4. An LH2 output line 424, a CcH2 output line 426, a GH2 output line 428, an N2 output line 430, an LNG output line 432, and a CNG output line 434 are fluidly coupled to the hydrant 420. In some examples, each hydrant of the plurality of hydrants 422 is fluidly coupled to the CcH2 tank bank 406, the GH2 tank bank 408, the LN2 tank 410, the LNG tank 412, and the CNG tank bank 414 via corresponding output lines different than the output lines 424-434.

In the illustrated example of FIG. 4, each hydrant of the plurality of hydrants 422 can be coupled respective aircraft (e.g., the aircraft 100, etc.) to refuel of a plurality of aircraft (e.g., the plurality of hydrogen aircraft 302, etc.) substantially simultaneously (e.g., at the same time, concurrently, etc.) from multiple hydrogen and/or hydrocarbon fuel sources. For example, a first aircraft can refuel at the hydrant 420 with LH2 fuel while a second aircraft refuels at another hydrant with GH2. In some examples, the hydrant 420 allows an aircraft to be refueled with multiple phases of hydrogen fuel (e.g., liquid, gaseous, etc.) and/or with multiple types of fuel (e.g., hydrogen, hydrocarbon, etc.) at the same time. Example implementations of the hydrant 420 are described below in connection with FIG. 5.

In the illustrative example of FIG. 4, the LH2 tank 404 is a spherical cryogenic tank that is capable of storing a larger volume of LH2 fuel than one of the LH2 tanks in the LH2 tank farm 304 of FIGS. 3a and 3b. In some examples, the LH2 tank 404 can store a larger volume of LH2 fuel than the entire LH2 tank farm 304. For example, the LH2 tank 404 can hold about 1.25 million gallons or 300,000 kilograms of LH2, and one of the LH2 tanks in the LH2 tank farm 304 can hold about 18,000 gallons or 4,500 kilograms of LH2. Furthermore, in some examples, the LH2 tank 404 has improved insulative properties due to the large internal volume. For example, the LH2 tank 404 can be associated with about less than 1% of the LH2 loss due to evaporation (e.g., boil-off) in a 24-hour period. By contrast, the tanks of the LH2 tank farm 304 typically experience about 1% or greater than 1% LH2 loss per day due to boil-off.

The multiphase hydrogen refueling system 400 includes an LH2 delivery assembly 436 to provide a first portion of the LH2 fuel in the LH2 tank 404 to hydrogen aircraft. Furthermore, the LH2 delivery assembly 436 converts a second portion of the LH2 into CcH2 fuel and a third portion of the LH2 into GH2 fuel. As such, the LH2 delivery assembly 436 provides CcH2 fuel to a CcH2 delivery assembly 438 and GH2 fuel to a GH2 delivery assembly 440. More specifically, the second portion of the LH2 is cryogenically compressed (cryo-compressed), diverted to a mixing tank 442, and mixed with GH2 to raise the temperature and produce the CcH2 fuel. Additionally, the third portion of the LH2 is cryo-compressed, vaporized, and transmitted to the GH2 tank bank 408 as high pressure GH2 (e.g., 400 Bar, 700 Bar, 1000 Bar, etc.). In some examples, the pressure within the GH2 tank bank 408 is greater than a storage pressure of GH2 fuel onboard the aircraft, such as within the GH2 tank bank 210 of FIG. 2. For example, when the pressure in the GH2 tank bank 210 of FIG. 2 is 350 Bar, the pressure within the GH2 tank bank 408 of FIG. 4 is 400 Bar. In another example, when the pressure in the GH2 tank bank 210 of FIG. 2 is 700 Bar, the pressure within the GH2 tank bank 408 of FIG. 4 is 850 Bar.

The LH2 delivery assembly 436 includes a plurality of transfer pumps 444 to supply the first portion of the LH2 to the hydrants 422, the second portion of the LH2 to the CcH2 delivery assembly 438, and/or the third portion of the LH2 to the GH2 delivery assembly 440. Moreover, the plurality of transfer pumps 444 includes an example first transfer pump 444a, an example second transfer pump 444b, and an example third transfer pump 444c. The first transfer pump 444a can provide the second portion and at least some of the third portion of the LH2 to be converted to the CcH2 fuel and the GH2 fuel, respectively. The second transfer pump 444b can provide the rest of the third portion of the LH2 to be converted into the GH2 fuel. In some examples, the transfer pumps 444 are cryogenic centrifugal pump that are electronically and/or hydraulically driven. The transfer pumps 444 can be submerged in the LH2 with the LH2 tank 404 and/or externally connected to the LH2 tank 404. In some examples, each one of the transfer pumps 444 provides a variable and distinct flow rate of LH2. Furthermore, each one of the transfer pumps 444 can be fluidly coupled to one or more LH2 flowlines 446. For examples, the first transfer pump 444a is coupled to a first LH2 transfer line 446a, the second transfer pump 444b is coupled to a second LH2 transfer line 446b, and the third transfer pump 444c is coupled to the LH2 output line 424. The first LH2 output line 446a leads to a first LH2 pump 444a, and the second LH2 output line 446b leads to a second LH2 pump 448b.

The LH2 delivery assembly 436 includes the first LH2 pump 448a and the second LH2 pump 448b to cryogenically compress the LH2. In some examples, the first LH2 pump 448a is similar or identical to the second LH2 pump 448b. Thus, descriptions of the first LH2 pump 448a can likewise apply to the second LH2 pump 448b. In some examples, the first LH2 pump 448a includes a suction adapter, a motor, a crank drive, and a cold end compression chamber (e.g., cylinder) with a reciprocating piston. The suction adapter enables the LH2 to flow into the compression chamber when the piston moves from a top-dead center (TDC) position to a bottom-dead center (BDC) position. The motor and the crank drive move the piston back to the TDC position to compress the LH2. In some examples, the suction adapter removes hydrogen vapor (e.g., bubbles) present in the LH2. Thus, the LH2 delivery assembly 436 includes a first GH2 vapor return line 450a and a second GH2 vapor return line 450b to send the vapor back to the LH2 tank 404. The first and second GH2 vapor return lines 450a, 450b can generate positive vapor pressure in the LH2 tank 404 to assist pressure driven flow of LH2 through the LH2 delivery assembly 436. In some examples, the multiphase hydrogen refueling system 400 includes less (e.g., one) or more (e.g., three, four, etc.) LH2 pumps than the first and second LH2 pumps 448a, 448b of the illustrative example of FIG. 4.

The LH2 delivery assembly 436 includes a first heat exchanger or vaporizer 452a positioned downstream of the first LH2 pump 448a, and a second heat exchanger or vaporizer 452b positioned downstream of the second LH2 pump 448b. In some examples, the first vaporizer 452a is similar or identical to the second vaporizer 452b. Thus, descriptions of the first vaporizer 452a can likewise apply to the second vaporizer 452b. In some examples, the first vaporizer 452a includes coils, lines, plates, etc. that are able to withstand high pressures (e.g., 400 Bar, 700 Bar, 1000 Bar, etc.) corresponding to an output pressure of the first LH2 pump 448a. As such, the first vaporizer 452a can produce GH2 at a vapor pressure that is greater than a pressure within the GH2 tank bank 408. Thus, the first LH2 pump 448a and the first vaporizer 452a can prevent or inhibit backflow of the GH2. However, in some examples, check valves are positioned downstream of the first and second vaporizers 452a, 452b to further restrict backflow.

In the illustrated example of FIG. 4, the LH2 flowlines 446, the LH2 output line 424, the first LH2 transfer line 446a, the second LH2 transfer line 446b, the first GH2 vapor return line 450a, and the second GH2 vapor return line 450b are vacuum jacketed (VJ) flowlines to insulate the LH2 and/or the GH2. Thus, the VJ flowlines ensure that the temperature of the flowing LH2 and/or GH2 does not increase above cryogenic temperature (e.g., 30K, etc.). In some examples, VJ flowlines include an inner and an outer pipe or line. The inner pipe carries the cryogenic fluid (e.g., LH2, GH2, etc.) and is insulated with multiple alternating layers of a heat barrier and a non-conductive spacer. The insulating layers create a space between the inner and outer pipes that is depressurized using a vacuum pump to create a static vacuum shield. The vacuum shield safeguards the example cryogenic fuel from heat transfer due to conduction, convection, and radiation.

The LH2 delivery assembly 436 of FIG. 4 includes a GH2 transfer line 454 to transfer evaporated GH2 vapor from the LH2 tank 404 to the GH2 tank bank 408. The GH2 transfer line 454 is coupled to a third heat exchanger or vaporizer 456 to warm the GH2 in the GH2 transfer line 454. The third vaporizer 456 is also coupled to a the plurality of hydrants 422 via a plurality of GH2 recovery lines 458. In some examples, the third vaporizer 456 is only coupled to the hydrant 420 via a GH2 recovery line 458a. In such examples, the multiphase hydrogen refueling system 400 can include multiple vaporizers similar to the third vaporizer 456 with each vaporizer coupled to one or more GH2 recovery lines of the plurality of GH2 recovery lines 458. As described in greater detail below, the hydrant 420 can recover evaporated GH2 and transmit the GH2 vapor to the GH2 tank bank 408 via the GH2 recovery line 458a.

In the illustrated example of FIG. 4, the LH2 delivery assembly 436 includes a GH2 compressor 460 coupled to the third vaporizer 456 to drive the GH2 from the LH2 tank 404, the hydrant 420, and/or the plurality of hydrants 422 to the GH2 tank bank 408. The GH2 compressor 460 is able to pressurize flowing GH2 and/or hydrogen vapor that enters the GH2 compressor 460 at warm temperatures (e.g., 250K, 275K, 300K, etc.). Thus, the LH2 delivery assembly 436 of FIG. 4 includes the third vaporizer 456 to increase the temperature of cryogenic hydrogen vapor extracted from the LH2 tank 404 to a temperature that is compatible with an acceptable operating temperature of the GH2 compressor 460. In some examples, the GH2 compressor 460 compresses the GH2 to a pressure that is greater than the storage pressure of the GH2 tank bank 408 (e.g., 400 Bar, 700 Bar, 1000 Bar, etc.).

The multiphase hydrogen refueling system 400 of FIG. 4 includes a junction 462 and an automatic valve 464 to divert the second portion of the LH2 from the first LH2 pump 448a to the mixing tank 442. The junction 462 and the automatic valve 464 are positioned downstream of the first LH2 pump 448a. The automatic valve 464 can variably adjust the amount of LH2 that is included in the second portion. In some examples, the automatic valve 464 is a proportional valve that changes the mass flowrate of the LH2 that flows to the mixing tank 442. As such, the multiphase hydrogen refueling system 400 can increase the amount of LH2 included in the second portion using the automatic valve 464 based on the amount of CcH2 fuel that is to be added to the CcH2 tank bank 406 (e.g., based on a fuel level in the CcH2 tank bank 406). In other words, the level of CcH2 fuel in the CcH2 tank bank 406 can be monitored, and the automatic valve 464 can increase the flowrate of LH2 (e.g., increase the amount of LH2 in the second portion). Thus, the automatic valve 464 can increase the amount of CcH2 fuel produced in mixing tank 442 and stored in the CcH2 tank bank 406.

The multiphase hydrogen refueling system 400 of FIG. 4 includes a pressure control valve 466 to transmit some GH2 from the GH2 tank bank 408 to the mixing tank 442. The mixing tank 442 combines the compressed LH2 from the first LH2 pump 448a with GH2 from the GH2 tank bank 408. In some examples, the pressure control valve 466 regulates the pressure of the GH2 down from a first pressure in the GH2 tank bank 408 to a second pressure less than the first pressure. The second pressure can be greater than or the same as a pressure in the mixing tank 442. Thus, the pressure control valve 466 can reduce the pressure of the GH2 to ensure the GH2 and the compressed LH2 properly mix into CcH2. In some examples, the pressure control valve 466 adjusts the second pressure based on the pressure within the mixing tank 442.

The multiphase hydrogen refueling system 400 of FIG. 4 includes a plurality of CNG input lines 468 to recover vented CNG from onboard LNG and/or CNG tank(s) of aircraft. The plurality of CNG input lines 468 includes a first CNG input line 468a coupled to the aircraft (e.g., the aircraft 100 of FIG. 1, etc.). In the illustrated example, the plurality of CNG input lines 468 are coupled to a buffer tank 470 to collect the CNG vented from the aircraft. Furthermore, a CNG pump 472 is coupled to the buffer tank and a plurality of CNG output lines 474 to drive the CNG from the buffer tank 470 to the plurality of hydrants 422. The plurality of CNG output lines 474 includes the CNG output line 434. In some examples, the CNG pump 472 automatically pressurizes the CNG to a certain pressure in the plurality of CNG output lines 474 such that a flow of CNG through the plurality of hydrants 422 remains relatively consistent.

In some examples, the aircraft vents CNG from a CNG tank bank (e.g., the CNG tank bank 212 of FIGS. 2A-2B, etc.) to the buffer tank 470 to generate a pressure driven flow of CNG to the plurality of hydrants 422. As such, the aircraft can release onboard CNG to the buffer tank 470 to reduce power used by the CNG pump 472. In some examples, each of the plurality of CNG input lines 468 are coupled to respective hydrants of the plurality of hydrants 422. In such examples, the first CNG input line 468a is coupled to the first hydrant 420 and the buffer tank 470. As such, the aircraft can couple to another port or valve on the hydrant 420 to vent onboard CNG. In other examples the plurality of CNG input lines 468 are coupled directly to the aircraft via pipes, ports, valves, etc. separate from the plurality of hydrants 422.

In some examples, the aircraft vents CNG from an onboard LNG tank (not shown) into the buffer tank 470 to generate a positive pressure differential, which causes the LNG to flow from the LNG tank 412 to the plurality of hydrants 422. For example, the aircraft 100 (FIG. 1) can release onboard CNG to the buffer tank 470 reduce a first vapor pressure within the onboard LNG tank of the aircraft to a value less than a second vapor pressure within the LNG tank 412, which influences the pressure driven flow of the LNG to the hydrants 422. In the illustrated example of FIG. 4, the plurality of hydrants 422 are coupled the LNG tank 412 via a plurality of LNG output lines 476. The plurality of LNG output lines 476 includes the LNG output line 432.

The multiphase hydrogen refueling system 400 of FIG. 4 includes a plurality of N2 output lines 478 to transmit N2 from the LN2 tank 410 to the plurality of hydrants 422. The plurality of N2 output lines 478 include the N2 output line 430. In the illustrated example, the plurality of N2 output lines 478 are coupled to an upper portion of the LN2 tank 410, which include the N2 vapor evaporated from the LN2 stored within the LN2 tank 410. As such, the N2 output lines 430 transfer gaseous N2 to the hydrants 422. However, in other examples, the plurality of N2 output lines 430 transmit LN2 to a vaporizer (not shown) to convert the LN2 to gaseous N2 prior to transmission to the plurality of hydrants 422. Unlike the output lines 424-428, 432, 434, the plurality of N2 output lines 430 do not couple to the aircraft. Rather, the plurality of N2 lines 478 are coupled to the plurality of hydrants 422 to purge a transfer line of air prior to the refueling process.

Figure 5:
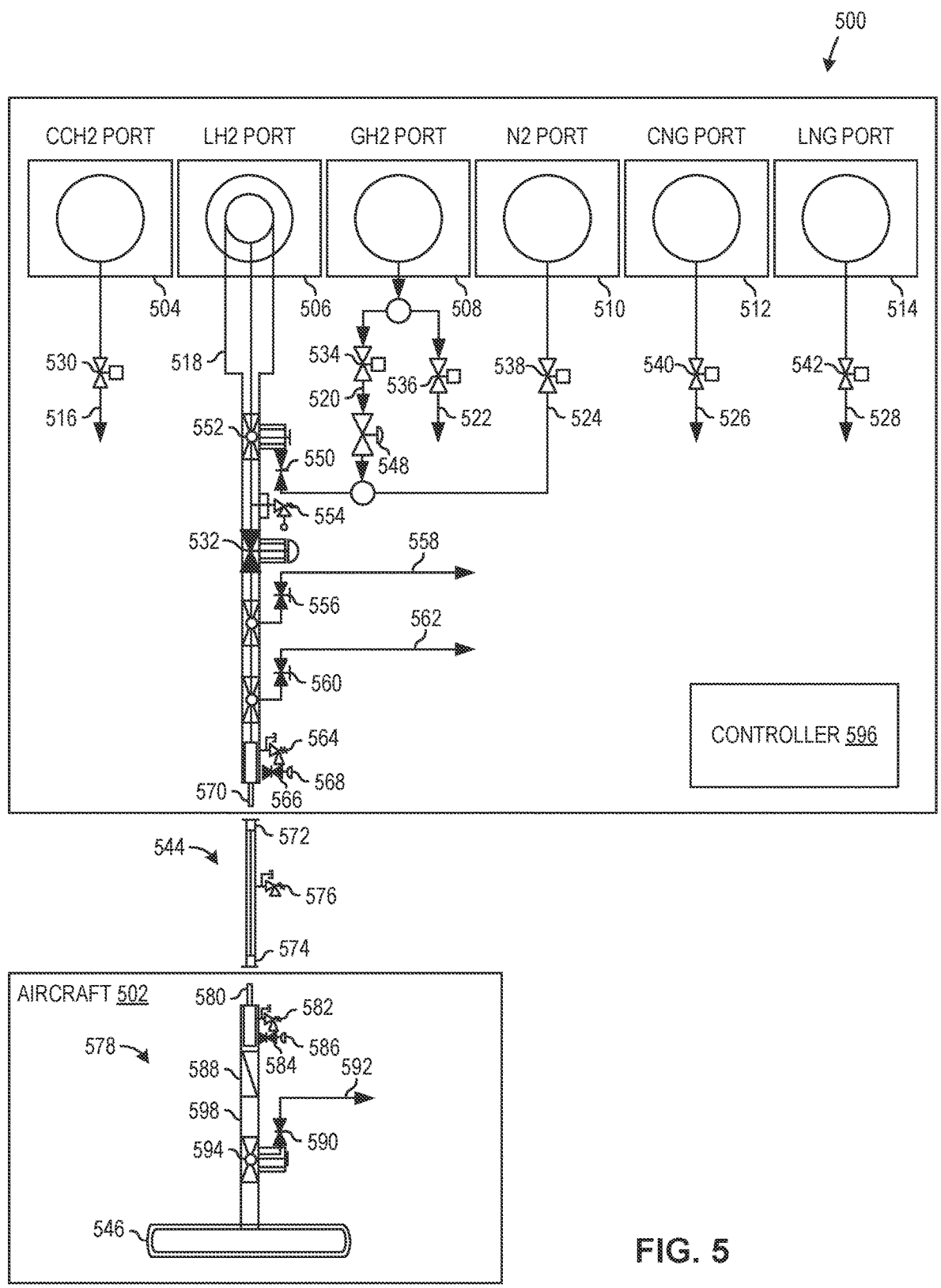
FIG. 5 is a schematic illustration of an example hydrant in accordance with teachings disclosed herein.

FIG. 5 is a schematic illustration of an example hydrant 500 in accordance with teaching disclosed herein. In the illustrated example of FIG. 5, the hydrant 500 is fluidly coupled to an aircraft 502 to refuel the aircraft 502 with LH2 fuel. The hydrant 500 can implement the hydrant 420 and/or any of the hydrants of the plurality of hydrants 422 of FIG. 4. Furthermore, the aircraft 502 can correspond to the aircraft 100 of FIG. 1 and/or another hydrogen aircraft that includes the first fuel distribution system 200A, the second fuel distribution system 200B, or another fuel distribution system that can manage the LH2 fuel onboard.

The hydrant 500 of FIG. 5 includes a CcH2 port 504, an LH2 port 506, a GH2 port 508, an N2 port 510, a CNG port 512, and an LNG port 514. Furthermore, the hydrant 500 includes a CcH2 line 516, an LH2 line 518, a first GH2 line 520, a second GH2 line 522, an N2 line 524, a CNG line 526, and an LNG line 528. In the illustrated example, the hydrant 500 includes a CcH2 valve 530, an LH2 valve 532, a first GH2 valve 534, a second GH2 valve 536, an N2 valve 538, a CNG valve 540, and an LNG valve 542.

As shown in the illustrative example of FIG. 5, the hydrant 500 can house (e.g., frame, support, encase, etc.) the ports 504-514, the lines 516-528, and/or the valves 530-542. In some examples, the hydrant 500 includes fewer ports than shown in FIG. 5. For example, the CcH2 port 504, the CcH2 line 516, and/or the CcH2 valve 530 can be coupled to a separate hydrant that is equipped to support and isolate the high pressures (e.g., 300 Bar, etc.) of the CcH2 fuel. In some examples, the hydrant 500 includes multiple ports, lines, and valves corresponding to the same or other types of fuel (e.g., hydrocarbon fuel such as Jet-A, Jet-A1, etc.). For example, the hydrant 500 can include a plurality of LH2 ports including the LH2 port 506. As such, the aircraft 502 can refuel multiple onboard tanks using the hydrant 500.

The hydrant 500 of FIG. 5 includes a transfer line 544 to couple the aircraft 502 to the hydrant 500. In the illustrated example of FIG. 5, the transfer line 544 fluidly couples the LH2 line 518 to a cryogenic tank 546 onboard the aircraft 502. However, the transfer line 544 can decouple from the LH2 line 518 of the hydrant 500 and couple to another output line (e.g., the CcH2 line 516, etc.). Furthermore, the transfer line 544 can decouple from the cryogenic tank 546 and couple to another onboard tank (e.g., the CcH2 tank 216 of FIG. 2B, etc.) of the aircraft 502. Thus, the aircraft 502 can refuel with multiple fuel sources (e.g., CcH2, GH2, CNG, etc.) at the hydrant 500 via the transfer line 544. In some examples, an operator decouples and recouples the transfer line 544 to/from the hydrant 500 (e.g., the LH2 line 518, etc.) and/or the aircraft 502 (e.g., the cryogenic tank 546, etc.).

In the illustrated example of FIG. 5, the transfer line 544 is a vacuum jacketed cryogenic transfer line that insulates flowing cryogenic fuel (e.g., LH2, CcH2, etc.) during a refueling process. In some examples, the transfer line 544 is a first transfer line, and the hydrant 500 includes one or more other transfer lines that are vacuum jacketed, non-vacuum insulated, or non-insulated. In such examples, the transfer line 544 can couple to the LH2 line 518 while other transfer lines are coupled to the CcH2 line 516, the second GH2 line 522, the CNG line 526, and/or the LNG line 528. As such, the cryogenic tank 546 can be refueled in conjunction with other tanks (e.g., the CcH2 tank 216, the GH2 tank bank 210, the CNG tank bank 212, etc.) onboard the aircraft 502.

The hydrant 500 of FIG. 5 further includes a pressure control valve 548, a purge valve 550, a shut-off valve 552, a first pressure safety valve 554, a GH2 return valve 556, a GH2 return line 558, a hydrant vent valve 560, a hydrant vent line 562, a second pressure safety valve 564, a gage valve 566, a temperature sensor 568, and a first male connector 570. The transfer line 544 further includes a first female connector 572, a second female connector 574, and a third pressure safety valve 576. The aircraft 502 further includes a cryogenic port 578 (e.g., refueling point) having a second male connector 580, a fourth pressure safety valve 582, a second gage valve 584, a second temperature sensor 586, a check valve 588, an aircraft vent valve 590, an aircraft vent line 592, and a fill valve 594 coupled to a fill line 598. Additionally, the hydrant 500 includes an example controller 596 to control (e.g., operate, instantiate, implement, etc.) the hydrant 500. For example, the controller 596 can cause the hydrant 500 to perform operations and/or processes (e.g., a purging process, a cooling process, the refueling process, etc.), as described in further detail below in connection with FIGS. 7-9.

The hydrant 500 of FIG. 5 includes the lines 516, 518, 522, 526, 528 and the supply valves 530, 532, 536, 540, 542 to supply a certain amount of fuel (e.g., LH2, GH2, etc.) to the aircraft 502 at a certain rate. In some examples, the LH2 line 518, the CcH2 line 516, and the transfer line 544 are vacuum jacketed flowlines capable of transmitting cryogenic fluids while maintaining temperatures below a certain level (e.g., 30K, etc.). As such, the LH2 valve 532 and the CcH2 valve 530 can be cryogenic and/or vacuum jacketed valves that do not allow significant temperature increases (e.g., above 1K, etc.) or significant pressure decreases (e.g., above 1 Bar, etc.) of the fluids. Furthermore, the transfer line 544 can be a flexible VJ line that is at least partially flexible along the length of the transfer line 544. For example, a first portion of the transfer line 544 is flexible and a second portion of the transfer line 544 is rigid. In some examples, the transfer line 544 is flexible, and the first male connector 570 is rigid.

In the illustrated example of FIG. 5, the first and second male connectors 570, 580 are vacuum-jacketed male bayonet connectors, and the first and second female connectors 572, 574 are vacuum-jacketed female bayonet connectors. The first male connector 570 can be similar or identical to the second male connector 580, such that the male connectors 570, 580 can be coupled to a same female connector, such as the first female connector 572 or the second female connector 574. In some examples, the male connectors and the female connectors include flanges that are coupled together via fasteners (e.g., bolts, clamps, threads, etc.). The female connectors 572, 574 can be vacuum jacketed such that when the male connectors 570, 580 are inserted (e.g., and the flanges fastened), the cryogenic temperature of the flowing fluid (e.g., LH2, etc.) remains consistent (e.g., within +/−1K, etc.).

The hydrant 500 includes the first pressure safety valve 554 and the second pressure safety valve 564 to release GH2 in case of excessive vapor pressures (e.g., 25 Bar, 50 Bar, etc.) in the LH2 line 518. Similarly, the transfer line 544 includes the third pressure safety valve 576 to release GH2 in case of excessive vapor pressures in the transfer line 544. Further, the aircraft 502 includes the fourth pressure safety valve 582 to release GH2 in case of excessive vapor pressures in the cryogenic port 578 and/or the cryogenic tank 546. The pressure safety valves 554, 564, 576, 582 can be quick opening valves that automatically open in response to a certain internal pressure. For example, the first pressure safety valve 554 can include a diaphragm that ruptures when the pressure in the LH2 line 518 exceeds 15 Bar. In some examples, the pressure safety valves 554, 564, 576, 582 are able to be closed after the high pressures are dissipated.

In the illustrated example of FIG. 5, the valves 530-542 are automatic valves that can open variably based on command signals (e.g., electronic signals, etc.) from the controller 596. Thus, the valves 530-542 can adjust an opening or effective area based on the command from the controller 596 to change the flowrate (e.g., mass flowrate, volumetric flowrate, etc.) of the corresponding fluid. In some examples, the hydrant 500 includes one or more flowmeters to detect the flowrate of a given fluid. The controller 596 can determine the amount of fuel supplied to the aircraft 502 based on the detected flowrates and/or the temperature(s) of the fluid(s).

As mentioned, the transfer line 544 can be connected and disconnected to the hydrant 500 and/or the aircraft 502. Thus, an internal channel (e.g., rigid and/or flexible pipe, hose, tube, etc.) of the transfer line 544 becomes exposed to atmosphere, and air enters the transfer line 544 and/or other refueling lines (e.g., the LH2 line 518, the CcH2 line 516, etc.). Thus, as shown in FIG. 5, the hydrant 500 includes the N2 line 524 and the N2 valve 538 to purge (e.g., decontaminate, etc.) the LH2 line 518 and the transfer line 544 of air after the transfer line 544 is coupled to the cryogenic port 578. More specifically, the hydrant 500 includes the N2 valve 538 to release pressurized N2 through the N2 line 524, which is fluidly coupled to the LH2 line 518. The purge valve 550 is opened to allow the N2 into the LH2 line 518, and the hydrant vent valve 560 is opened to release the air into the atmosphere. In some examples, the hydrant vent line 562 leads from the LH2 vent valve to one or more vent stacks that disperses the gas into the atmosphere. The vent stacks can be at a location separate from a refueling station where the hydrant 500 is located. In some examples, the shut-off valve 552, the purge valve 550, the hydrant vent valve 560, and/or the N2 valve 538 are closed after a first time threshold (e.g., time limit or counter threshold, such as 30 seconds, 60 seconds, etc.) is satisfied.

Although the example purging and cooling operations are described in connection with the transfer line 544 and the LH2 line 518, the same operations can apply to other refuel lines, such as the CcH2 line 516 and/or the second GH2 line 522. For example, the CcH2 line 516 can also be coupled to the N2 line 524 and the first GH2 line 520 to purge the CcH2 line 516 and the transfer line 544 with nitrogen and GH2, respectively. Thus, when the transfer line 544 is coupled to the CcH2 line 516 for refueling CcH2 fuel, the same purging and cooling operations disclosed herein can be performed using the CcH2 fuel as the cooling agent.

After the LH2 line 518 is purged of the air, the LH2 line 518 is filled with N2. Thus, the hydrant 500 of FIG. 5 includes the first GH2 line 520 and the first GH2 valve 534 to purge the LH2 line 518 and the transfer line 544 of N2. More specifically, the hydrant 500 includes the first GH2 valve 534 to release pressurized GH2 through the first GH2 line 520, which is also fluidly coupled to the LH2 line 518 (e.g., via a split valve, tee fitting, etc.). The purge valve 550 and the hydrant vent valve 560 are again opened to allow the GH2 into the LH2 line 518 and to release the N2 into the atmosphere. In some examples, the shut-off valve 552, the purge valve 550, the hydrant vent valve 560, and/or the first GH2 valve 534 are closed after a second time threshold (e.g., 30 seconds, 60 seconds, etc.) is satisfied.

In some examples, the first time threshold is determined or chosen based on the pressure of an N2 source (e.g., vapor pressure of the LN2 tank 410 of FIG. 4, etc.), and the second time threshold is based on the pressure of a GH2 source (e.g., pressure of the GH2 tank 408a of FIG. 4, etc.). For example, the first time threshold can be reduced based on a higher upstream pressure of the N2. The first and second time threshold can be the same or different values. In some examples, the first time threshold is long enough to enable the hydrant 500 to purge air substantially completely such that the lines 518, 544 include nearly 100% N2 (e.g., 99% N2, etc.). Further, in some examples, the second time threshold is long enough to enable the hydrant 500 to purge the N2 substantially completely such that the lines 518, 544 include nearly 100% GH2 (e.g., 99% GH2, etc.).

Because the hydrant 500 is capable of purging the transfer line 544 and a corresponding output flowline (e.g., the LH2 line 518, the CcH2 line 516, etc.), the hydrant 500 helps ensure that the hydrogen fuel is not diluted, contaminated, hazardous, or less potent. For example, if not purged, oxygen from air in the transfer line 544 would combine with the hydrogen fuel, which could cause combustion given a certain pressure or presence of a heat source (e.g., electric spark, radiant heat, etc.). Furthermore, contents of the air can solidify (e.g., freeze) due to the cryogenic temperatures of the LH2 (e.g., 20K, 30K, etc.), such as N2, which can solidify at 65K. The presence of solid matter in the cryogenic tank 546 can lead to issues with onboard LH2 storage and/or delivery. For example, a volume of solidified N2 in the cryogenic tank 546 equates to storage space unusable for hydrogen fuel, such as LH2. Additionally, N2 solids can flow into flowlines leading to cryogenic pumps, which can cause damage to such pumps. Furthermore, in some cases, dilution of the LH2 fuel with air can reduce the potency of the LH2 and reduce the efficiency or power generation of the engine of the aircraft 502. For at least the foregoing reasons, the hydrant 500 purges (e.g., decontaminates, etc.) refueling line(s) (e.g., the LH2 line 518, the CcH2 line 516, etc.), the transfer line 544, and/or a portion of the fill line 598 of the aircraft 502 to improve the quality or purity of the hydrogen fuel supplied to the aircraft 502.

After the LH2 line 518 and the transfer line 544 are purged and before refueling of the aircraft 502 begins, the temperature of the lines 518, 544 can be warmer than the cryogenic temperature of the LH2 fuel. For example, the transfer line 544 can be at a temperature similar to the surrounding atmosphere, such as zero, 20, 30 degrees Celsius, etc. When LH2 flows into the LH2 line 518 and the transfer line 544 at such conditions, heat from the lines 518, 544 transfers to the LH2, which evaporates the LH2. Rather than releasing the evaporated hydrogen into the atmosphere, the hydrant 500 includes the GH2 return valve 556 and the GH2 return line 558 to capture the evaporated hydrogen vapor such that hydrogen fuel is not wasted. The GH2 return line 558 can eventually lead to a GH2 tank (e.g., the GH2 tank bank 408 of FIG. 4) to store the hydrogen vapor for later use as fuel. The GH2 return line 558 can be coupled to the GH2 recovery line 458a of FIG. 4 or another one of the recovery lines in the plurality of recovery lines 458 of FIG. 4.

The hydrant 500 includes the gage valve 566 and the temperature sensor 568 (e.g., thermocouple, etc.) to monitor the temperature of the LH2 line 518 and/or the transfer line 544 during a cooling process. That is, while the LH2 is cooling the LH2 line 518 and the transfer line 544, the temperature sensor 568 measures the temperature inside of the LH2 line 518 and the transfer line 544. In some examples, the temperature sensor 568 is coupled to the gage valve 566, and the gage valve 566 opens periodically to expose the temperature sensor to an interior of the LH2 line 518 for temperature monitoring.

In some examples, the fill valve 594 remains closed during the cooling process. The LH2 can continue to flow into the lines 518, 544 while evaporating and releasing hydrogen vapor into the GH2 return line 558. In some examples, the LH2 line 518 includes a sensor to monitor the level of LH2 to inhibit overflowing of the LH2 line 518 or transfer line 544. When the temperature inside of the LH2 line 518 and/or the transfer line 544 satisfies a cooldown threshold (e.g., 35K, 30K, 25K, etc.), the GH2 return valve 556 is closed and the fill valve 594 opens to begin the refueling process.

The aircraft 502 of the illustrative example of FIG. 5 includes the second gage valve 584 and the second temperature sensor 586 to detect the temperature of the LH2 fuel while refueling. In some examples, the aircraft 502 includes a flowmeter coupled to the cryogenic port 578 to measure a flowrate of the LH2 and to determine a volume of LH2 fueled based on the temperature, density, flowrate, length of time of refueling, etc.

The aircraft 502 further includes the aircraft vent valve 590 and the aircraft vent line 592 to release hydrogen vapor that can evaporate in the cryogenic port 578. For example, prior to refueling, a first portion of the fill line 598 (e.g., upstream of the fill valve 594, etc.) can be purged and cooled along with the LH2 line 518 and the transfer line 544 while a second portion of the fill line 598 (e.g., downstream of the fill valve 594, etc.) remains at or near a consistent temperature. As such, the aircraft vent valve 590 can be opened to release hydrogen vapor that evaporates in the second portion of the fill line 598.

Figure 6:
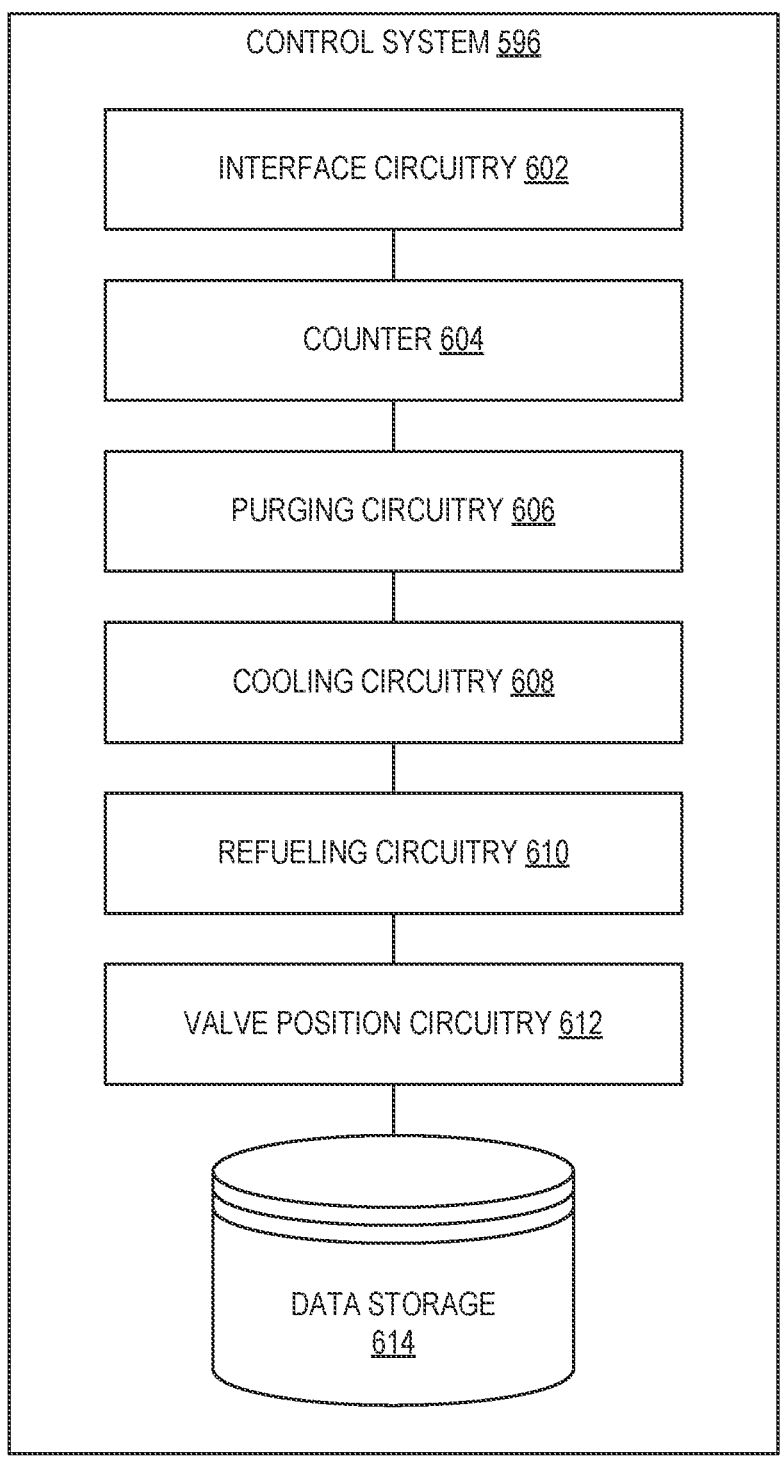
FIG. 6 is a block diagram of an example controller to implement the example hydrant of FIG. 5.

FIG. 6 is a block diagram of the example controller 596 of FIG. 5 to implement the hydrant 500. The controller 596 can be used to automatically and/or manually purge the transfer line 544, cool the transfer line 544, and refuel the aircraft 502 with fuel, such as LH2, GH2, CNG, etc. That is, the controller 596 can help ensure air is absent from the transfer line 544 and the temperature of the transfer line 544 is similar to the cryogenic temperature of LH2. More specifically, the controller 596 can open and/or close valves (e.g., the LH2 valve 532, the first GH2 valve 534, etc.) of the hydrant 500 at certain intervals to purge and cool the LH2 line 518, the transfer flowline 544, and/or the fill line 598. Furthermore, the controller 596 can cause the hydrant 500 to refuel the aircraft 502 with different types of fuel (e.g., hydrogen, hydrocarbon, etc.) based on inputs from an input device (e.g., switch, sensor, computer, etc.).

The controller 596 of the illustrated example of FIG. 6 includes interface circuitry 602, counter circuitry 604, purging circuitry 606, cooling circuitry 608, refueling circuitry 610, valve circuitry 612, and data storage 614. The controller 596 of FIGS. 5 and 6 may be instantiated (e.g., creating an instance of, bring into being for any length of time, materialize, implement, etc.) by processor circuitry such as a central processing unit executing instructions. Additionally or alternatively, the controller 596 of FIGS. 5 and 6 may be instantiated (e.g., creating an instance of, bring into being for any length of time, materialize, implement, etc.) by application specific integrated circuit(s) (ASIC(s)) or Field Programmable Gate Array(s) (FPGA(s)) structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

The controller 596 includes the interface circuitry 602 to synchronize operation between input/output device(s) and circuitry (e.g., processor circuitry) of the controller 596. In some examples, the interface circuitry 602 is instantiated by processor circuitry executing interface instructions and/or configured to perform operations such as those represented by the flowchart of FIGS. 7, 8 and/or 9. In some examples, the interface circuitry 602 obtains signals from input device(s) that cause the hydrant to start or stop the purging process, the cooling process, or the refueling process. For example, when an operator or a control system of the aircraft 502 indicates to the controller 596 to refuel the aircraft 502 with a certain type of fuel, the interface circuitry 602 can generate and/or direct a signal to one or more other circuitry of the controller 596 to implement the hydrant 500.

The controller 596 includes the counter circuitry 604 to increment a counter after a certain length of time (e.g., a second, etc.) and to log the value of the counter in memory (e.g., cache memory, the data storage 614, etc.). For example, the counter circuitry 604 can increment a first counter and/or a second counter to be used to determine whether the transfer line 544 is purged of air and/or N2, respectively. The counter circuitry 604 can provide a current value of the first or second counters when prompted. In some examples, the counter circuitry 604 decrements a timer corresponding to the first and/or second time thresholds. For example, when the first time threshold is 30 seconds, the counter circuitry 604 can initiate a countdown from 30 seconds when commanded (e.g., when the purge valve 550 is opened, etc.).

The controller 596 includes the purging circuitry 606 to remove air and/or N2 from the LH2 line 518 and/or the transfer line 544. More specifically, the purging circuitry 606 obtains data from the counter circuitry 604 and/or the interface circuitry 602, such as the first counter value, the second counter value, and/or the current stage of the refueling process (e.g., opened/closed positions of valves of the hydrant 500, etc.). In some examples, the purging circuitry 606 is instantiated by processor circuitry executing purging instructions and/or configured to perform operations such as those represented by the flowcharts of FIGS. 7 and 8. The purging circuitry 606 can function as a closed loop controller that obtains input feedback data (e.g., the first counter value) from the counter circuitry 604 and sends output data (e.g., position of the N2 valve 538) to the valve controller circuitry 612 of the controller 596. The purging circuitry 606 can determine whether the first counter value satisfies the first time threshold and whether the second counter satisfies the second time threshold.

The controller 596 of FIG. 6 includes the cooling circuitry 610 to ensure the LH2 line 518 and/or the transfer line 544 are cooled to cryogenic temperatures before the aircraft 502 is refueled. More specifically, the cooling circuitry 610 obtains data (e.g., temperature measurements) from the temperature sensor 568 and/or the interface circuitry 602 to detect a temperature within the LH2 line 518. Furthermore, the cooling circuitry 610 can determine whether the temperature satisfies the cooling threshold. In some examples, the cooling circuitry 610 is instantiated by processor circuitry executing cooling instructions and/or configured to perform operations such as those represented by the flowcharts of FIGS. 7 and/or 9. The cooling circuitry 610 can function as a closed loop controller that obtains input feedback data (e.g., the temperature) from the temperature sensor 568 and sends output data (e.g., valve position) to the valve position circuitry 606. In some examples, the cooling circuitry 610 can cause the interface circuitry 602 to send a signal to the fill valve 594 of the aircraft of FIG. 5 to open and begin the refueling process when the temperature of the LH2 line 518 and/or the transfer line 544 satisfies the cooling threshold.

The controller 596 includes the refueling circuitry 612 to fuel the aircraft 502 with a certain type of fuel after the transfer line 544 is purged and cooled. More specifically, the refueling circuitry 612 can obtain data (e.g., a fuel level) from the aircraft 502 and determine whether the fuel level satisfies the fuel level threshold. In some examples, the refueling circuitry 612 closes valve(s) (e.g., the LH2 valve 532, the fill valve 594, etc.) in response to a command from a control system of the aircraft 502 indicating the end of the refuel process. In some examples, the refueling circuitry 612 is instantiated by processor circuitry executing refueling instructions and/or configured to perform operations such as those represented by the flowchart of FIG. 7.

The controller 596 includes the valve position circuitry 612 to permit and restrict flow of fluids throughout certain lines of the hydrant 500 based on different stages of the refueling process. More specifically, the valve position circuitry 612 receives signals indicating a desired valve position from the purging circuitry 606 and/or the cooling circuitry 608. In some examples, the valve position circuitry 612 is instantiated by processor circuitry executing valve position instructions and/or configured to perform operations such as those represented by the flowchart of FIGS. 7-9.

The controller 596 includes the data storage 614 to store data (e.g., counters, temperatures, thresholds, current operating conditions, etc.) or any information associated with the interface circuitry 602, the counter circuitry 604, the purging circuitry 606, the cooling circuitry 608, the refueling circuitry 610, and/or the valve position circuitry 612. The data storage 614 of the illustrated example of FIG. 6 can be implemented by any memory, storage device and/or storage disc for storing data, such as flash memory, magnetic media, optical media, etc. Furthermore, the data stored in the example data storage 614 can be in any data format such as binary data, comma delimited data, tab delimited data, structured query language (SQL) structures, image data, etc.

While an example implementation of the controller 596 of FIG. 5 is illustrated in FIG. 6, one or more of the elements, processes, and/or devices illustrated in FIG. 6 may be combined, divided, re-arranged, omitted, eliminated, and/or implemented in another way. Further, the interface circuitry 602, the counter circuitry 604, the purging circuitry 606, the cooling circuitry 608, the refueling circuitry 610, the valve position circuitry 612, and/or, more generally, the controller 596 of FIG. 5, may be implemented by hardware alone or by hardware in combination with software and/or firmware. Thus, for example, any of the interface circuitry 602, the counter circuitry 604, the purging circuitry 606, the cooling circuitry 608, the refueling circuitry 610, the valve position circuitry 612, and/or, more generally, the controller 596, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGA(s). Further still, the example controller 596 of FIG. 5 may include one or more elements, processes, and/or devices in addition to, or instead of, those illustrated in FIG. 5, and/or may include more than one of any or all of the illustrated elements, processes, and devices.

Figure 7:
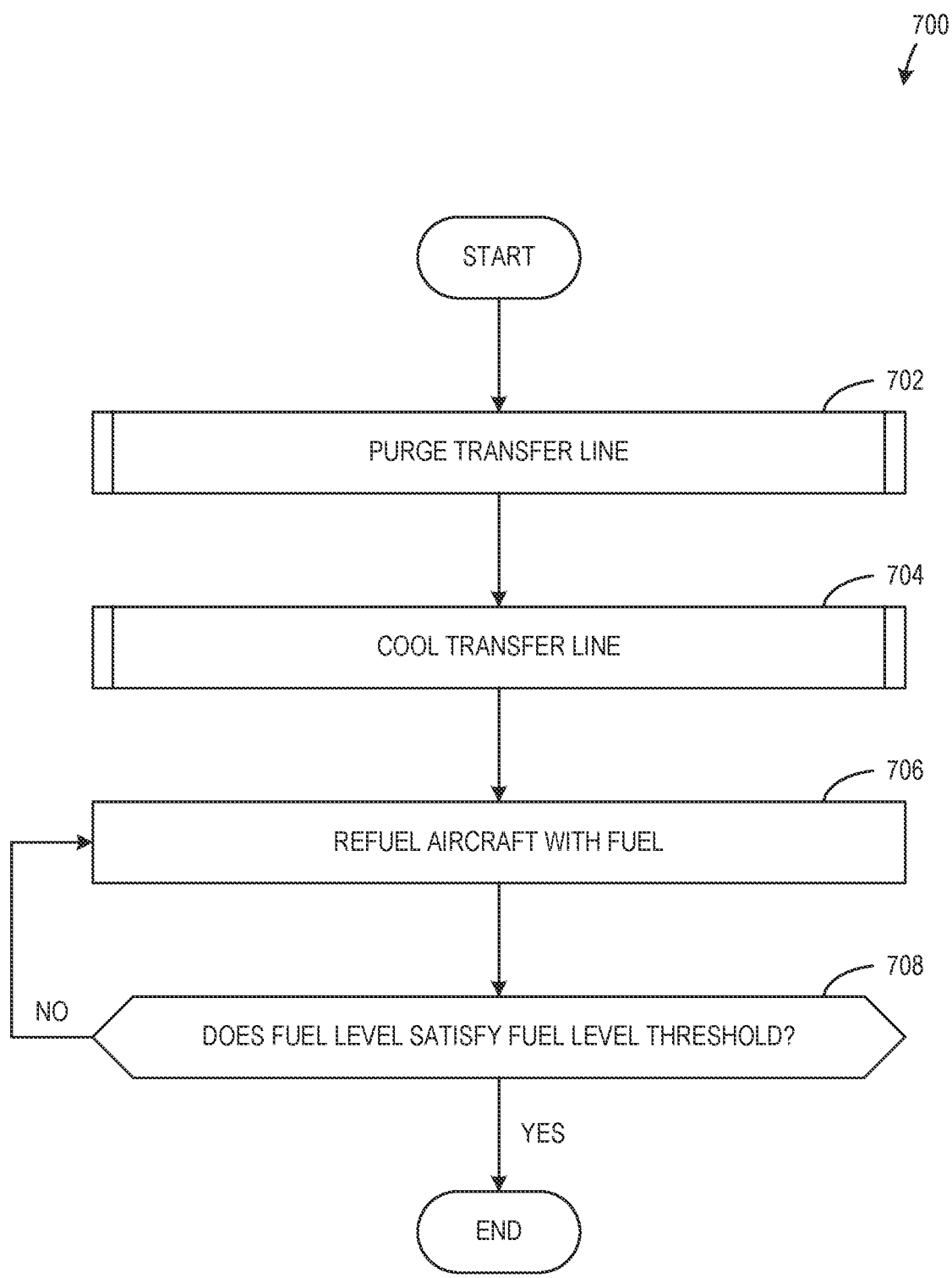
FIGS. 7-9 are flowcharts representative of example machine readable instructions and/or example operations that may be executed by example processor circuitry to implement the example controller of FIG. 6.
Figure 8:
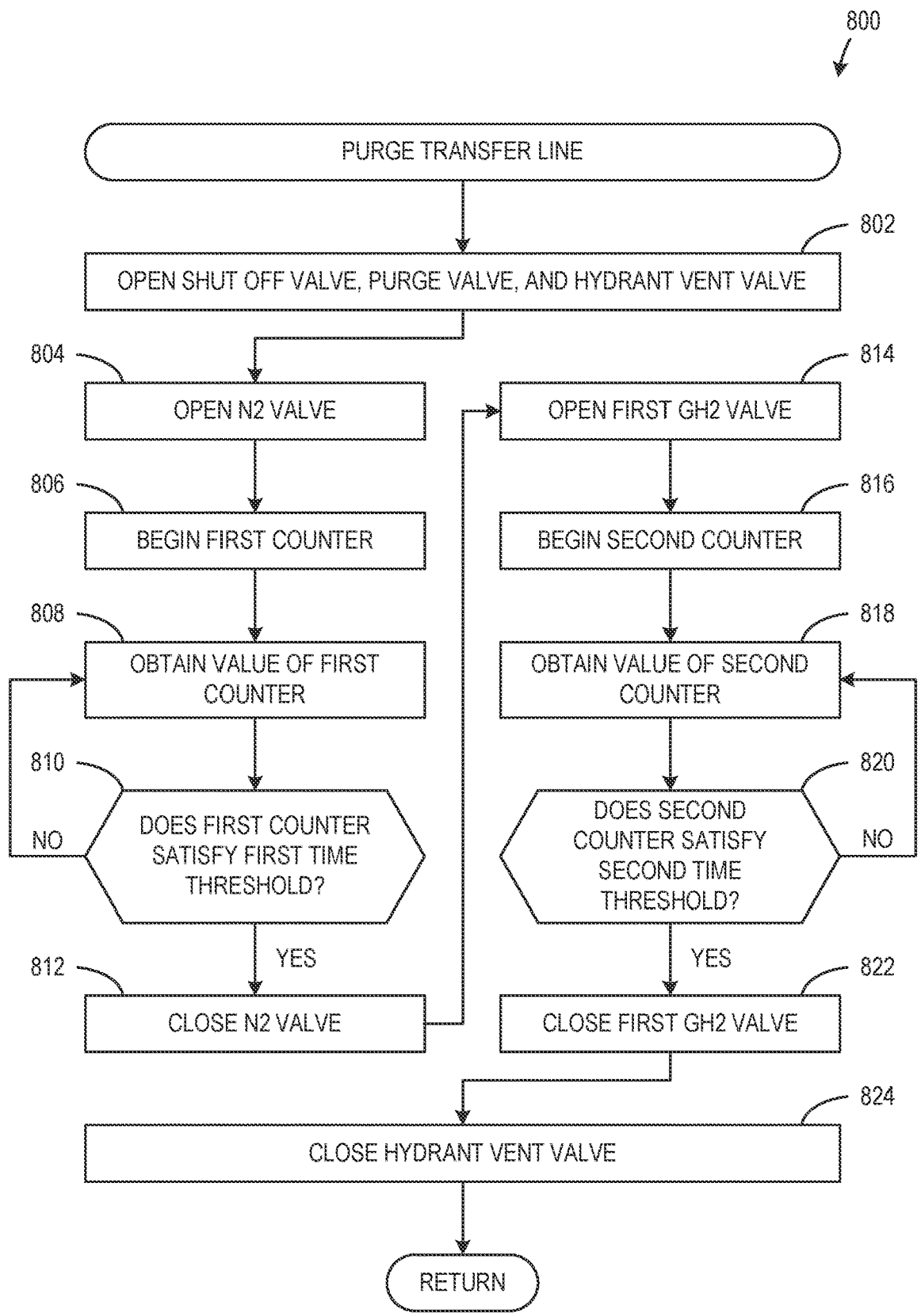
Figure 9:
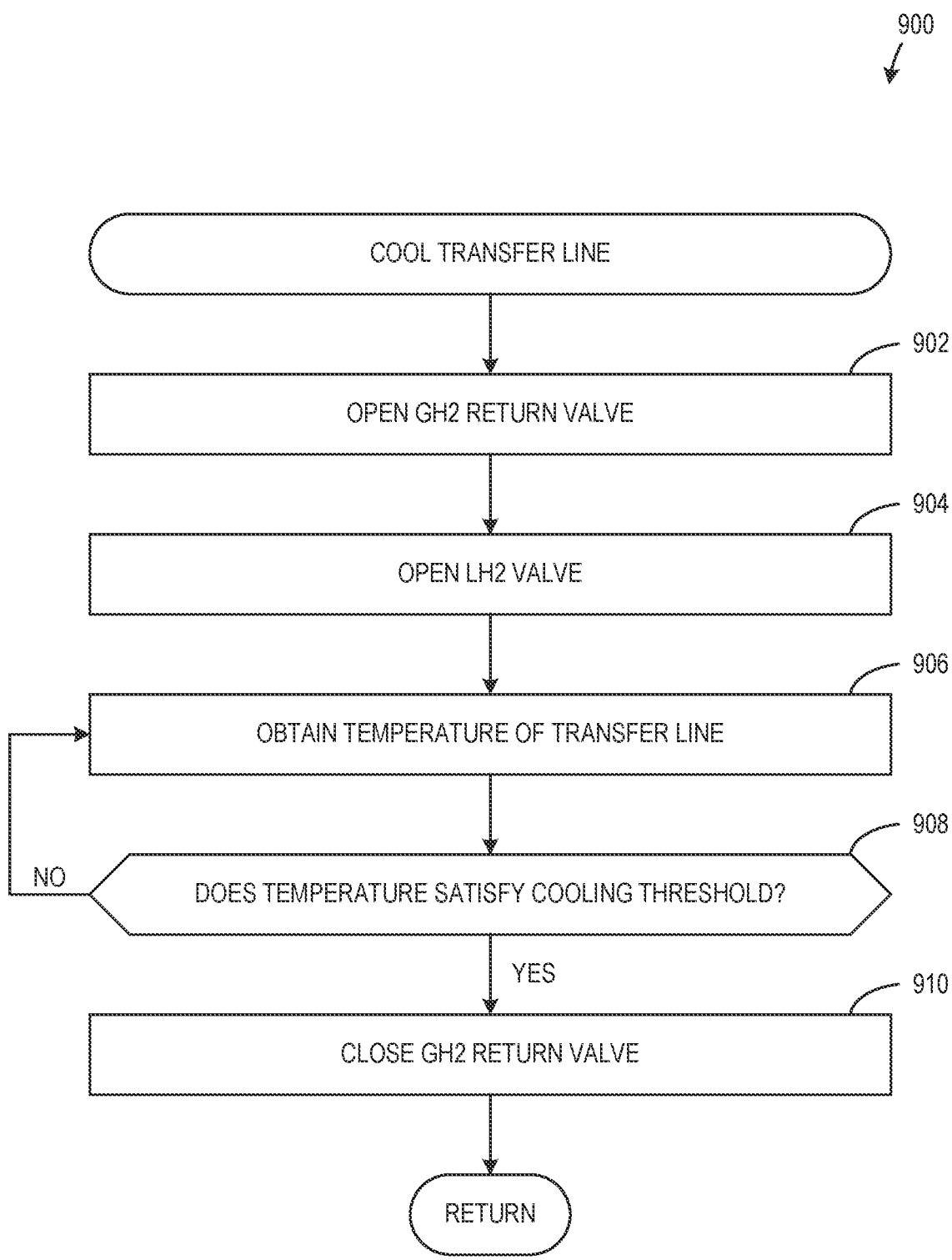

Flowcharts representative of example machine readable instructions, which may be executed to configure and/or cause processor circuitry to implement the controller 596 of FIG. 5, is shown in FIGS. 7-9. The machine readable instructions may be one or more executable programs or portion(s) of an executable program for execution by processor circuitry, such as processor circuitry 1012 shown in an example processor platform 1000 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-9, many other methods of implementing the example controller 596 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer and/or machine readable instructions) stored on at least one non-transitory computer and/or machine readable media and/or medium such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 7 is a flowchart representative of example methods and/or example operations 700 that are performed by the controller 596 of FIG. 5 to refuel hydrogen aircraft (e.g., the aircraft 100 of FIG. 1, etc.). The operations 700 of FIG. 7 help ensure that hydrogen fuel (e.g., LH2, CcH2, etc.) is not contaminated by air and that hydrogen fuel is conserved during refueling of the aircraft. In some examples, the operations 700 begin after the transfer line 544 is connected to the hydrant 500 and the cryogenic port 578 of the aircraft 502. Example operations in connections with FIGS. 7-9 are disclosed with reference to refueling with LH2 fuel and to purging and cooling the transfer line 544. However, such operations can apply to other types of hydrogen fuel and/or other lines connected to the transfer line 544, such as the LH2 line 518, the CcH2 line 516, the second GH2 line 522, etc.

The machine readable instructions and/or the operations 700 of FIG. 7 begin at block 702, at which the controller 596 purges the transfer line 544 (e.g., using the purging circuitry 606, etc.) such that air and/or N2 is removed therefrom. At block 704, the controller 596 cools (e.g., using the cooling circuitry 608, etc.) the transfer line 544 such that the amount and/or flowrate of LH2 does not vary during refueling due to evaporation, which can negatively affect monitoring of the amount of fuel supplied to the aircraft. Furthermore, evaporation of LH2 during refueling can introduce additional GH2 gases into the cryogenic tank 546, which can occupy volume otherwise used for LH2 or increase the vapor pressure within the cryogenic tank 546. The examples operations of blocks 702 and 704 are described in greater detail in connections with FIG. 8.

At block 706, the controller 596 refuels the aircraft (e.g., the aircraft 502, etc.) with fuel, such as LH2. For example, the valve position circuitry 612 can open the fill valve 594 and/or the LH2 valve 532 to cause the LH2 to flow into the cryogenic tank 546 of FIG. 5. At block 708, the controller 596 determines whether the fuel level of the cryogenic tank 546 satisfies a fuel level threshold. For example, the refueling circuitry 610 can obtain a fuel level from the aircraft 502 and determine a difference between the fuel level and the fuel level threshold. In some examples, the refueling circuitry 610 obtains a command from the aircraft 502 to cease refueling. When the refueling circuitry 610 determines that the fuel level does not satisfy the fuel level threshold, the operations 700 return to block 706, and the hydrant 500 continues refueling the aircraft 502. When the fuel level does satisfy the fuel level threshold, the example operations 700 end.

FIG. 8 is a flowchart representative of example methods and/or example operations 700 that are performed by the controller 596 of FIG. 5 to purge the transfer line 544 of air and, subsequently, N2. The operations 800 of FIG. 8 help ensure that hydrogen fuel (e.g., LH2, CcH2, etc.) is not contaminated by air or sold N2 matter. Although the example operations 800 are described with reference to purging the transfer line 544 for a certain time duration, the controller 596 can cause the hydrant 500 to purge the transfer line 544 with N2 or GH2 until a concentration level of air or N2 is below a certain threshold value. For example, the controller 596 uses a sensor to detect an amount of GH2 in the transfer line 544 when purging the N2 to reduce the amount of GH2 that escapes through the hydrant vent valve 560.

The example operations 800 begin at block 802 at which the controller 596 (e.g., the valve position circuitry 612) opens the shut-off valve 552, the purge valve 550, and the hydrant vent valve 560. At block 804, the example valve position circuitry 612 opens the N2 valve 538. For example, the valve position circuitry 612 can send a signal to the N2 valve 538 to open by a certain amount based on the upstream pressure. When the N2 valve 538 opens, the operations 800 proceed to block 806, at which the controller 596 begins (e.g., using the counter circuitry 604) the first counter. At block 808, the example purging circuitry 606 obtains the value of the first counter from the counter circuitry 604. At block 810, the example purging circuitry 606 determines whether the first counter satisfies the first time threshold. When the first counter value does not satisfy the first time threshold, the operations 800 return to block 808. Otherwise, the operations 800 proceed to block 812, at which the valve position circuitry 612 closes the N2 valve 538. In some examples, the counter circuitry 604 decrements a first timer set to the first threshold and signals the purging circuitry 606 when the first timer has expired.

At block 814, the controller 596 opens (e.g., using the valve position circuitry 612) the first GH2 valve 534. For example, the valve position circuitry 612 can send a signal to the first GH2 valve 534 to open by a certain amount based on a pressure in the GH2 tank bank 408 of FIG. 4. The operations 800 then proceed to block 816, at which the controller 596 begins (e.g., using the counter circuitry 604) the second counter. At block 818, the example purging circuitry 606 obtains the value of the second counter from the counter circuitry 604. In some examples, the counter circuitry 604 decrements a second timer set to the second threshold and signals the purging circuitry 606 when the second timer has expired. At block 820, the example purging circuitry 606 determines whether the second counter satisfies the second time threshold. When the second counter value does not satisfy the second time threshold, the operations 800 return to block 818. Otherwise, the operations 800 proceed to block 822, at which the valve position circuitry 612 closes the first GH2 valve 534. At block 824, the controller (e.g., the valve position circuitry 612) closes the hydrant vent valve 560, and the example operations 800 return to block 704 of FIG. 7.

FIG. 9 is a flowchart representative of example methods and/or example operations 900 that are performed by the controller 596 of FIG. 5 to cool the transfer line 544 prior to refueling. The operations 900 of FIG. 9 help ensure that hydrogen fuel does not evaporate during the refueling process. The example operations 900 begin at block 902, at which the controller 596 opens (e.g., using the valve position circuitry 612) the GH2 return valve 560. At block 904, the example valve position circuitry 612 opens the LH2 valve 532 to allow LH2 to enter into the LH2 line 518 and the transfer line 544. At block 906, the example cooling circuitry 608 and/or the interface circuitry 602 obtain a temperature (e.g., an internal temperature) of the transfer line 544 and/or the LH2 line 518 via the first temperature sensor 568. At block 908, the example cooling circuitry 608 determines whether the temperature of the transfer line 544 satisfies the cooling threshold. When the temperature does not satisfy the cooling threshold, the operations 900 return to block 906. Otherwise, the operations 900 proceed to block 910, at which the example valve position circuitry 612 closes the GH2 return valve 558. Following completion of block 910, the example operations 900 return to block 706 of FIG. 7.

Figure 10:
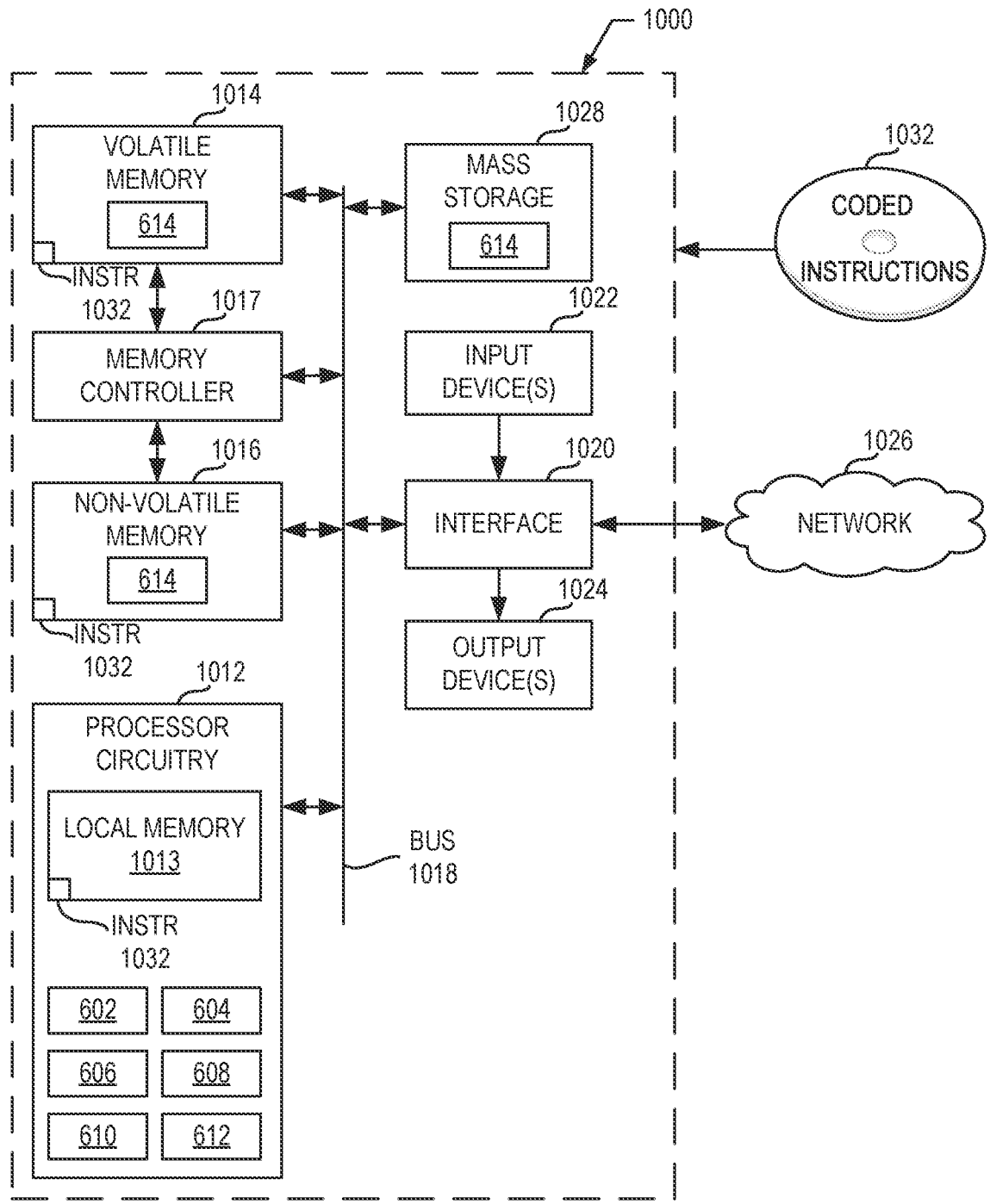
FIG. 10 is a block diagram of an example processing platform including processor circuitry structured to execute the example machine readable instructions and/or the example operations of FIGS. 8 and 9 to implement the example controller of FIG. 6.

FIG. 10 is a block diagram of an example processor platform 1000 structured to execute and/or instantiate the machine readable instructions and/or the operations of FIG. 10 to implement the controller 596 of FIG. 5. The processor platform 1000 can be, for example, a personal computer, a workstation, a self-learning machine (e.g., a neural network), a mobile device (e.g., a cell phone, a smart phone, a tablet such as an iPad™), a headset (e.g., an augmented reality (AR) headset, a virtual reality (VR) headset, etc.) or other wearable device, a full authority digital engine (or electronics) control (FADEC), an avionics system, or another type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the interface circuitry 602, the counter circuitry 604, the purging circuitry 606, the cooling circuitry 608, the refueling circuitry 610, the valve position circuitry 612, and/or, more generally, the controller 596.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, a keyboard, a button, a mouse, a touchscreen, a track-pad, a trackball, an isopoint device, and/or a control panel.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a control panel, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

Example systems, methods, and apparatus for refueling hydrogen aircraft are disclosed herein. Disclosed multiphase hydrogen refueling systems can connect a plurality of hydrants distributed across an airport to multiple sources of hydrogen and hydrocarbon fuel. For example, the multiphase hydrogen refueling system can include an LH2 tank, a CcH2 tank bank, a GH2 tank bank, a CNG tank bank, and an LNG tank to provide multiple phases of hydrogen fuel (e.g., liquid, gaseous, cryo-compressed, supercritical, etc.)

and multiple types of hydrocarbon fuel (e.g., natural gas, Jet-A, etc.) to an aircraft. Example hydrants disclosed herein are coupled to the fuel sources such that the aircraft can refuel with each type of fuel via one or more transfer lines at the same hydrant location. Example multiphase hydrogen systems disclosed herein further include an LN2 tank to provide N2 to the hydrant to purge air from the transfer line prior to refueling. Furthermore, the GH2 from the GH2 tank bank can be provided to the hydrant to purge the N2 from the transfer line after the air is purged.

Example multiphase hydrogen refueling systems disclosed herein improve the refueling processes and capabilities of airports at which hydrogen aircraft land and refuel. Disclosed multiphase hydrogen refueling systems can purge and cool a transfer line of the hydrant prior to refueling the hydrogen aircraft. As such, the hydrogen aircraft can refuel at a gate or terminal of the airport with multiple types of fuel without needing to taxi to another refuel station or needing a tanker to drive on the tarmac to the aircraft. Thus, disclosed multiphase hydrogen refueling systems and example hydrants disclosed herein improve the efficiency and reduce the resources associated with refueling hydrogen aircraft at airports. Furthermore, disclosed hydrants can purge and cool the transfer line to improve the quality of fuel (e.g., LH2 fuel) supplied to the hydrogen aircraft, reduce the amount of fuel wasted during refueling, provide a consistent refueling flowrate to the aircraft, recapture hydrogen vapor that evaporated during refueling or cooling, inhibit excess hydrogen vapor from entering the onboard cryogenic tank, etc.

Example systems, methods, apparatus, and articles of manufacture for refueling hydrogen aircraft are disclosed herein. Further examples and combinations thereof include the following:

A multiphase hydrogen refueling system comprising a liquid hydrogen (LH2) tank coupled to at least one of a cryo-compressed hydrogen (CcH2) tank and a gaseous hydrogen (GH2) tank, a liquid nitrogen (LN2) tank, and a hydrant coupled to the LH2 tank, the CcH2 tank, the GH2 tank, and the LN2 tank, the hydrant including a transfer line to refuel an aircraft with at least LH2, CcH2, or GH2, a purge valve to purge the transfer line using at least one of nitrogen (N2) from the LN2 tank or GH2 from the GH2 tank, and a GH2 return line to transmit evaporated GH2 back to the GH2 tank.

The multiphase hydrogen refueling system of any preceding clause, wherein the hydrant further includes an LH2 port and an LH2 line, the LH2 port fluidly coupled to the LH2 tank, the LH2 line including an LH2 valve.

The multiphase hydrogen refueling system of any preceding clause, wherein the hydrant further includes a GH2 return line coupled to the LH2 line via a GH2 return valve.

The multiphase hydrogen refueling system of any preceding clause, wherein the GH2 return line is fluidly coupled to the GH2 tank.

The multiphase hydrogen refueling system of any preceding clause, wherein the hydrant further includes a hydrant vent line coupled to the LH2 line via a hydrant vent valve.

The multiphase hydrogen refueling system of any preceding clause, wherein the hydrant includes a GH2 port, a first GH2 line, and a second GH2 line, the first GH2 line including a first GH2 valve, the GH2 port coupled to the GH2 tank.

The multiphase hydrogen refueling system of any preceding clause, wherein the hydrant includes an N2 port coupled to the LN2 tank and an N2 line, the N2 line including an N2 valve.

The multiphase hydrogen refueling system of any preceding clause, wherein the first GH2 line and the N2 line are fluidly coupled to the LH2 line via a purge valve.

The multiphase hydrogen refueling system of any preceding clause, wherein the hydrant includes a temperature sensor coupled to the LH2 line.

The multiphase hydrogen refueling system of any preceding clause, wherein the hydrant includes a sensor to detect an amount of GH2 in at least one of the transfer line or the LH2 line.

The multiphase hydrogen refueling system of any preceding clause, wherein the hydrant includes a controller to open the hydrant vent valve, open the purge valve, open the N2 valve, begin a first counter, and close the N2 valve when the first counter satisfies a first time threshold.

The multiphase hydrogen refueling system of any preceding clause, wherein the controller is to open the first GH2 valve, being a second counter, close the first GH2 valve when the second counter satisfies a second time threshold, and close the hydrant vent valve.

The multiphase hydrogen refueling system of any preceding clause, wherein the controller is to open the GH2 return valve, open the LH2 valve, obtain a temperature of at least one of the transfer line or the LH2 line, and close the GH2 return valve when the temperature satisfies a cooling threshold.

The multiphase hydrogen refueling system of any preceding clause, wherein the LH2 line includes a first male connector, and the transfer line includes a first female connector coupled to the first male connector.

The multiphase hydrogen refueling system of any preceding clause, wherein the transfer line is coupled to the LH2 line and a cryogenic port of the aircraft, the cryogenic port including a second male connector, and the transfer line including a second female connector coupled to the second male connector.

The multiphase hydrogen refueling system of any preceding clause, wherein the first male connector and the second male connector are vacuum-jacketed male bayonet connectors, and the first female connector and the second female connector are vacuum-jacketed female bayonet connectors.

A hydrant comprising a liquid hydrogen (LH2) port coupled to an LH2 tank and an LH2 line, the LH2 line including an LH2 valve, a gaseous hydrogen (GH2) port coupled to a GH2 tank, a first GH2 line, and a second GH2 line, the first GH2 line including a first GH2 valve, a nitrogen (N2) port coupled to a liquid nitrogen (LN2) tank and an N2 line, the N2 line including an N2 valve, a transfer line coupled to the hydrant and an aircraft, and a controller to cause the hydrant to purge the transfer line, cool the transfer line, and refuel the aircraft with at least one of LH2 fuel or GH2 fuel.

The hydrant of any preceding clause, further including a cryo-compressed hydrogen (CcH2) port coupled to a CcH2 tank and a CcH2 line.

The hydrant of any preceding clause, further including a compressed natural gas (CNG) port coupled to a CNG tank bank and a CNG line, and a liquid natural gas (LNG) port coupled to an LNG tank and an LNG line.

The hydrant of any preceding clause, wherein the transfer line is coupled to the LH2 line and a cryogenic port of the aircraft, the cryogenic port including a fill line fluidly coupled to the transfer line and a cryogenic tank of the aircraft.

The hydrant of any preceding clause, further including a purge valve coupled to the LH2 line, the first GH2 line, and the N2 line, a vent valve coupled to the LH2 line, and a GH2 return valve coupled to the LH2 line.

The hydrant of any preceding clause, wherein the controller is to open the N2 valve, open the purge valve, and open the vent valve to purge air from the LH2 line and the transfer line.

The hydrant of any preceding clause, wherein the controller is to open the first GH2 valve, open the purge valve, and open the vent valve to purge N2 from the LH2 line and the transfer line.

The hydrant of any preceding clause, wherein the controller is to open the GH2 return valve, and open the LH2 valve to cool the LH2 line and transfer line prior to refueling the aircraft.

A method for refueling a hydrogen aircraft using a hydrant, the method comprising purging a liquid hydrogen (LH2) line and a transfer line of the hydrant with nitrogen (N2) and gaseous hydrogen (GH2), the transfer line coupled to the LH2 line, the LH2 line coupled to an LH2 tank via an LH2 port, cooling the LH2 line and the transfer line with liquid hydrogen (LH2) from the LH2 tank, and refueling an aircraft via the transfer line with LH2 fuel from the LH2 tank.

The method of any preceding clause, wherein the purging of the LH2 line and the transfer line includes opening a vent valve coupled to the LH2 line, opening an N2 valve coupled to an N2 line of the hydrant, the N2 line coupled to a liquid nitrogen (LN2) tank via an N2 port, starting a first counter, and closing the vent valve and the N2 valve when the first counter satisfies a first time threshold.

The method of any preceding clause, wherein the purging of the LH2 line and the transfer line further includes opening the vent valve, opening a GH2 valve coupled to a GH2 line of the hydrant, the GH2 line coupled to a GH2 tank bank via a GH2 port, starting a second counter, and closing the vent valve and the GH2 valve when the second counter satisfies a second time threshold.

The method of any preceding clause, wherein the cooling of the LH2 line and the transfer line includes opening a GH2 return valve coupled to the LH2 line, opening an LH2 valve coupled to the LH2 line, determining whether an internal temperature of the LH2 line and the transfer line satisfies a cooling threshold, and closing the GH2 return valve when the internal temperature satisfies the cooling threshold.

The method of any preceding clause, further including determining whether a fuel level in a tank of the aircraft satisfies a fuel level threshold, and ending the refueling of the aircraft when the fuel level satisfies the fuel level threshold.

A controller comprising purging circuitry to purge a transfer line of a hydrant with nitrogen (N2) and gaseous hydrogen (GH2), cooling circuitry to cool the transfer line with liquid hydrogen (LH2), and refueling circuitry to refuel an aircraft with at least LH2 fuel or GH2 fuel.

A non-transitory machine readable storage medium comprising instructions that, when executed, cause processor circuitry to at least purge a transfer line of a hydrant with nitrogen (N2) and gaseous hydrogen (GH2), cool the transfer line with liquid hydrogen (LH2), and refuel an aircraft with at least LH2 fuel or GH2 fuel.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A multiphase hydrogen refueling system comprising:
    a liquid hydrogen (LH2) tank coupled to at least one of a cryo-compressed hydrogen (CcH2) tank and a gaseous hydrogen (GH2) tank;
    a liquid nitrogen (LN2) tank; and
    a hydrant coupled to the LH2 tank, the CcH2 tank, the GH2 tank, and the LN2 tank, the hydrant including:
        an LH2 port fluidly coupled to the LH2 tank;
        an LH2 line including an LH2 valve, the LH2 line including a first male connector;
        a transfer line to refuel an aircraft with at least LH2, CcH2, or GH2, the transfer line coupled to the LH2 line and a cryogenic port of the aircraft, the transfer line includes a first female connector coupled to the first male connector, the cryogenic port including a second male connector, and the transfer line including a second female connector coupled to the second male connector;
        a purge valve to purge the transfer line using at least one of nitrogen (N2) from the LN2 tank or GH2 from the GH2 tank; and
        a GH2 return line to transmit evaporated GH2 back to the GH2 tank.

2. The multiphase hydrogen refueling system of claim 1, wherein the hydrant further includes a GH2 return line coupled to the LH2 line via a GH2 return valve.

3. The multiphase hydrogen refueling system of claim 2, wherein the GH2 return line is fluidly coupled to the GH2 tank.

4. The multiphase hydrogen refueling system of claim 2, wherein the hydrant further includes a hydrant vent line coupled to the LH2 line via a hydrant vent valve.

5. The multiphase hydrogen refueling system of claim 4, wherein the hydrant includes a GH2 port, a first GH2 line, and a second GH2 line, the first GH2 line including a first GH2 valve, the GH2 port coupled to the GH2 tank.

6. The multiphase hydrogen refueling system of claim 5, wherein the hydrant includes an N2 port coupled to the LN2 tank and an N2 line, the N2 line including an N2 valve.

7. The multiphase hydrogen refueling system of claim 6, wherein the first GH2 line and the N2 line are fluidly coupled to the LH2 line via the purge valve.

8. The multiphase hydrogen refueling system of claim 7, wherein the hydrant includes a temperature sensor coupled to the LH2 line.

9. The multiphase hydrogen refueling system of claim 8, wherein the hydrant includes a sensor to detect an amount of GH2 in at least one of the transfer line or the LH2 line.

10. A multiphase hydrogen refueling system comprising:
    a liquid hydrogen (LH2) tank coupled to at least one of a cryo-compressed hydrogen (CcH2) tank and a gaseous hydrogen (GH2) tank;
    a liquid nitrogen (LN2) tank; and
    a hydrant coupled to the LH2 tank, the CcH2 tank, the GH2 tank, and the LN2 tank, the hydrant including:
        a transfer line to refuel an aircraft with at least LH2, CcH2, or GH2;
        a GH2 port coupled to the GH2 tank;
        a first GH2 line including a first GH2 valve;
        a second GH2 line;
        an LH2 port fluidly coupled to the LH2 tank;
        an LH2 line including an LH2 valve;
        a temperature sensor coupled to the LH2 line;

a sensor to detect an amount of GH2 in at least one of the transfer line or the LH2 line;

a purge valve to purge the transfer line using at least one of nitrogen (N2) from the LN2 tank or GH2 from the GH2 tank; and an N2 line, the N2 line including an N2 valve, the first GH2 line and the N2 line are fluidly coupled to the LH2 line via the purge valve;

an N2 port coupled to the LN2 tank and the N2 line;

a GH2 return line to transmit evaporated GH2 back to the GH2 tank, the GH2 return line fluidly coupled to the GH2 tank, the GH2 return line coupled to the LH2 line via a GH2 return valve, a hydrant vent line coupled to the LH2 line via a hydrant vent valve; and a controller to:
 open the hydrant vent valve;
 open the purge valve;
 open the N2 valve;
 begin a first counter; and
 close the N2 valve when the first counter satisfies a first time threshold.

11. The multiphase hydrogen refueling system of claim 10, wherein the controller is to:
 open the first GH2 valve;
 being a second counter;
 close the first GH2 valve when the second counter satisfies a second time threshold; and
 close the hydrant vent valve.

12. The multiphase hydrogen refueling system of claim 11, wherein the controller is to:
 open the GH2 return valve;
 open the LH2 valve;
 obtain a temperature of at least one of the transfer line or the LH2 line; and
 close the GH2 return valve when the temperature satisfies a cooling threshold.

13. The multiphase hydrogen refueling system of claim 1, wherein the first male connector and the second male connector are vacuum-jacketed male bayonet connectors, and the first female connector and the second female connector are vacuum-jacketed female bayonet connectors.

14. A method for refueling a hydrogen aircraft using a hydrant, the method comprising:
 purging a liquid hydrogen (LH2) line and a transfer line of the hydrant with nitrogen (N2) and gaseous hydrogen (GH2), the transfer line coupled to the LH2 line, the LH2 line coupled to an LH2 tank via an LH2 port;
 cooling the LH2 line and the transfer line with liquid hydrogen (LH2) from the LH2 tank; and
 refueling an aircraft via the transfer line with LH2 fuel from the LH2 tank.

15. The method of claim 14, wherein the purging of the LH2 line and the transfer line includes:
 opening a vent valve coupled to the LH2 line;
 opening an N2 valve coupled to an N2 line of the hydrant, the N2 line coupled to a liquid nitrogen (LN2) tank via an N2 port;
 starting a first counter; and
 closing the vent valve and the N2 valve when the first counter satisfies a first time threshold.

16. The method of claim 15, wherein the purging of the LH2 line and the transfer line further includes:
 opening the vent valve;
 opening a GH2 valve coupled to a GH2 line of the hydrant, the GH2 line coupled to a GH2 tank bank via a GH2 port;
 starting a second counter; and
 closing the vent valve and the GH2 valve when the second counter satisfies a second time threshold.

17. The method of claim 14, wherein the cooling of the LH2 line and the transfer line includes:
 opening a GH2 return valve coupled to the LH2 line;
 opening an LH2 valve coupled to the LH2 line;
 determining whether an internal temperature of the LH2 line and the transfer line satisfies a cooling threshold; and
 closing the GH2 return valve when the internal temperature satisfies the cooling threshold.

* * * * *